US012472703B2

(12) United States Patent
Kirchhoff et al.

(10) Patent No.: US 12,472,703 B2
(45) Date of Patent: Nov. 18, 2025

(54) AUTOMATED FIBER PLACEMENT OF PLIES WITH STAGGERING

(71) Applicant: The Boeing Company, Chicago, IL (US)

(72) Inventors: Joseph G. Kirchhoff, Tukwila, WA (US); Brice A. Johnson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 500 days.

(21) Appl. No.: 17/647,434

(22) Filed: Jan. 7, 2022

(65) Prior Publication Data
US 2023/0219305 A1 Jul. 13, 2023

(51) Int. Cl.
B29C 70/30 (2006.01)
B29C 70/38 (2006.01)
G05B 19/4155 (2006.01)

(52) U.S. Cl.
CPC .......... B29C 70/302 (2021.05); B29C 70/382 (2013.01); G05B 19/4155 (2013.01); *G05B 2219/35113* (2013.01)

(58) Field of Classification Search
CPC ..... B29C 70/302; B29C 70/38; B29C 70/382; B29C 70/384; B29C 70/386; B29C 70/388; G05B 19/4155; G05B 2219/35113
See application file for complete search history.

(56) References Cited

U.S. PATENT DOCUMENTS

| | | | |
|---|---|---|---|
| 2010/0204815 A1* | 8/2010 | Murrish | G05B 19/4097 700/98 |
| 2018/0017258 A1* | 1/2018 | Stieg | F23R 3/007 |
| 2018/0284724 A1* | 10/2018 | Moruzzi | B29C 70/384 |
| 2018/0285498 A1* | 10/2018 | Balabanov | G06F 30/23 |

OTHER PUBLICATIONS

Analysis and Optimization of Cylindrical Structures Manufactured by Automated Fiber Placement Technique, Sedat Guldu, Jan. 2014, Thesis submitted to the Graduate School of Natural and Applied Sciences of Middle East Technical University. (Year: 2014).*
New Standards Based Data Exchange "Bridge" for Design (CAD), Analysis (CAE) and Manufacturing (CAM) of Composite Structures, Hunten et al., downloaded May 4, 2011 from http://www.mscsoftware.com/support/library/conf/auc99/ (Year: 2011).*
European Patent Office Extended Search Report, dated Jul. 7, 2023, regarding Application No. EP22211667.5, 8 pages.
CGTech, Vericut Composite Programming, User Manual, 2007, 12 pages.

* cited by examiner

*Primary Examiner* — George R Koch
(74) *Attorney, Agent, or Firm* — Yee & Associates, P.C.

(57) ABSTRACT

A method, apparatus, system, and computer program product for designing a composite hollow body. A computer system selects ply layers for the hollow composite body. The ply layers comprise courses having course edges. The computer system positions the course edges between the ply layers throughout the hollow composite body to create a staggering of the course edges between the ply layers for a design of the hollow composite body.

22 Claims, 16 Drawing Sheets

AUTOMATED FIBER PLACEMENT OF PLIES WITH STAGGERING

BACKGROUND INFORMATION

1. Field

The present disclosure relates generally to an improved composite manufacturing system and in particular, to a method, apparatus, system, and computer program product for designing hollow composite bodies.

2. Background

Vehicle such as submarines and aircraft are being designed and manufactured with greater and greater percentages of composite materials. Composite materials are used in submarines. For example, submarine hulls, bow domes, periscope fairings, and other components can be manufactured using composite materials. Submarine hulls fabricated from composite materials can withstand large amounts compressive pressure. Further, less issues are present with corrosion using composite materials.

As another example, composite materials are used in aircraft to decrease the weight of the aircraft. This decreased weight improves performance features such as payload capacity and fuel efficiency. Further, composite materials provide longer service life for various components in an aircraft.

Composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

Manufacturing composite parts such as hollow composite bodies for submarine hulls or aircraft fuselages can be challenging. For example, obtaining desire levels of smoothness for hollow composite bodies can be more difficult than desired Therefore, it would be desirable to have a method and apparatus that take into account at least some of the issues discussed above, as well as other possible issues. For example, it would be desirable to have a method and apparatus that overcome a technical problem with manufacturing hollow composite bodies.

SUMMARY

An embodiment of the present disclosure provides a method for designing a composite hollow body. A computer system selects ply layers for the hollow composite body. The ply layers comprise courses having course edges. The computer system positions the course edges between the ply layers throughout the hollow composite body to create a staggering of the course edges between the ply layers for a design of the hollow composite body. According to other illustrative embodiments, an apparatus, a computer system, and a computer program product for designing a composite hollow body are provided.

Another embodiment of the present disclosure provides a method for designing a composite hollow body. A method for designing a hollow composite body. A computer system selects a ply layer in ply layers in a design for the hollow composite body to form a selected ply layer. The computer system staggers in an iterative manner course edges between the selected ply layer in the ply layers and other ply layers in the ply layers, wherein a result of increased staggering of the course edges between the ply layers occurs and the result is used in a next iteration with another selected ply layer until a desired level of staggering occurs. According to other illustrative embodiments, an apparatus, a computer system, and a computer program product for designing a composite hollow body are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account designing and manufacturing hollow composite bodies can involve the presence of gaps between course edges for courses in ply layers. The illustrative embodiments recognize and take into account that the overlap gaps between courses through the ply layers four a hollow composite body can lead to the formation of wrinkling when curing composite materials light up for the hollow composite body.

The illustrative embodiments recognize and take into account that current techniques for generating designs for composite hollow bodies do not adequately control staggering between courses through the ply layers. The illustrative embodiments recognize and take into account that with current designs using starting points can cause plies to overlap locally as the circumference of the cylindrical hollow composite body increases. The illustrative embodiments recognize and take into account that current techniques only take into account a previous ply and do not take into account overlaps between course edges throughout the ply layers for the composite hollow body.

Thus, the illustrative embodiments provide a method, apparatus, system, and computer program product for manufacturing a composite hollow body with a desired level staggering between course edges throughout the ply layers. In the illustrative example, the staggering is performed iteratively in a manner that can enable convergence on and optimize design for laying up composite materials for courses imply layers for a hollow composite body.

In one illustrative example, course edges are identified throughout ply layers in a composite hollow body. The alignment of course edges are staggered throughout the ply layers. At least one of a rotation of apply layer or the change of course widths for courses within a ply layer can be performed to increase the staggering of the course edges throughout the ply layers. This type of adjustment can be performed iteratively for each ply layer throughout the thickness of the composite hollow body to obtain a design of the composite hollow body that has increased staggering in which the increased staggering can meet a desired tolerance for staggering of course edges in the composite hollow body.

Figure 1:
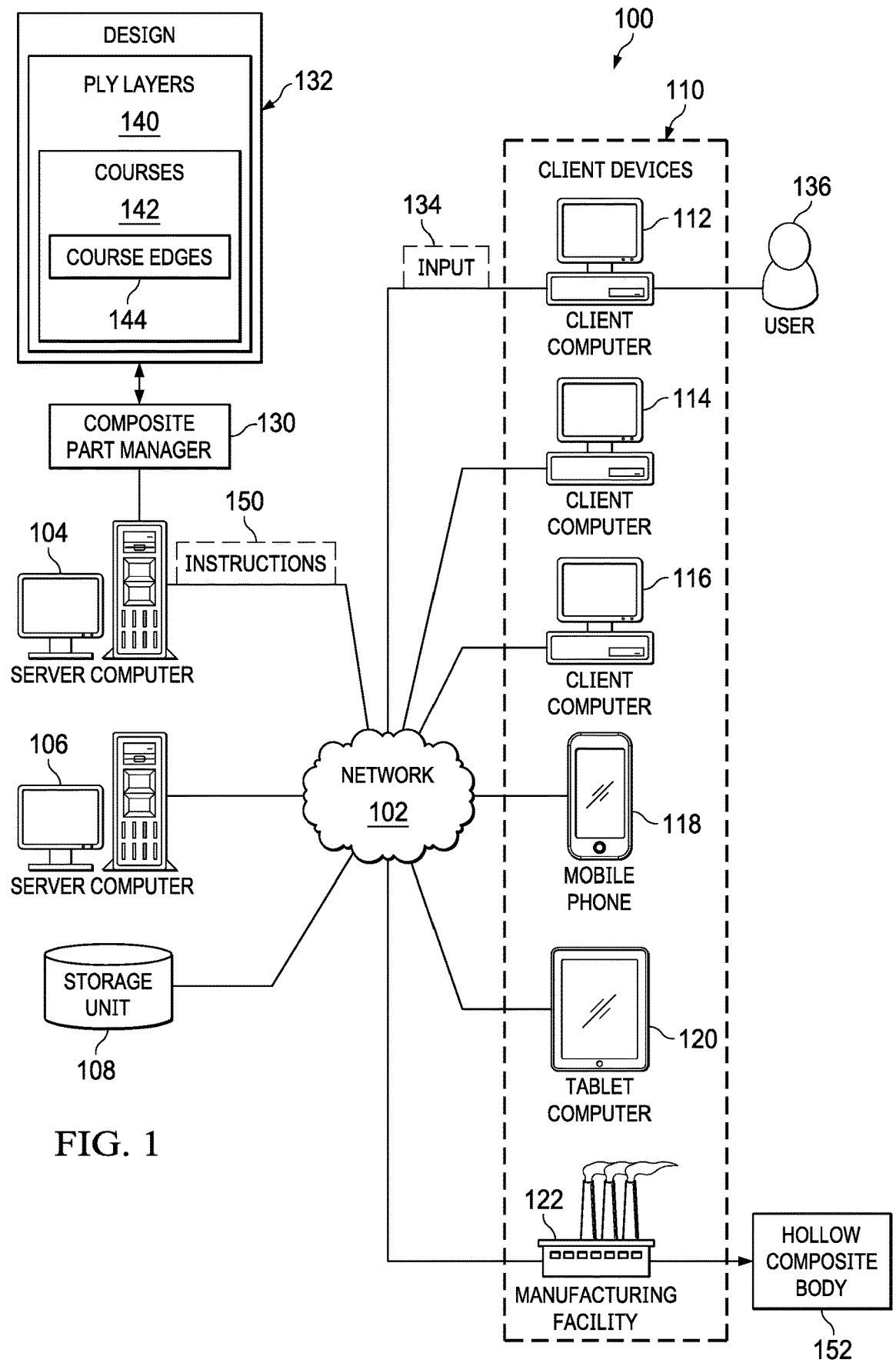
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client systems 110 are physical hardware systems that connect to network 102. As depicted, client systems 110 include client computer 112, client computer 114, and client computer 116. Client systems 110 can be, for example, computers, workstations, network computers, a data processing system, a building, or a warehouse, a manufacturing floor, or some other structure that implements data processing systems. In the depicted example, server computer 104 provides information, such as boot files, operating system images, and applications to client systems 110. Further, client systems 110 can also include other types of client devices such as mobile phone 118, tablet computer 120, and manufacturing facility 122. In this illustrative example, server computer 104, server computer 106, storage unit 108, and client systems 110 are network devices that connect to network 102 in which network 102 is the communications media for these network devices. Some or all of client systems 110 may form an Internet of things (IoT) in which these physical devices can connect to network 102 and exchange information with each other over network 102.

Client systems 110 are clients to server computer 104 in this example. Network data processing system 100 may include additional server computers, client computers, and other devices not shown. Client systems 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client systems 110 over network 102 for use on client systems 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, composite part manager 130 can create design 132 for composite hollow bodies such as a submarine hull or an aircraft fuselage. Manufacturing facility 122. The creation of design 132 by composite part manager 130 can be performed with input 134 received from user 136 at client computer 112. For example, user 136 can provide specifications in input 134 for design 132. The specifications can include, for example, a number of ply layers for the composite hollow body, compressive strength, dimensions, ply directions, and other specifications for the composite hollow body.

In this illustrative example, design 132 for the composite hollow body can include ply layers 140 having courses 142 with course edges 144. Composite part manager 130 can assist in creating design 132 or optimize design 132 through reducing overlaps between course edges 144 in different ply layers in ply layers 140.

In other words, composite part manager 130 can increase the staggering of ply layers 140 in design 132 in a manner that reduces undesired inconsistencies such as wrinkling, depressions, or other undesired inconsistencies that may be out of tolerance for design 132. In this illustrative example, tolerances can be specified in design 132 for input 134 and an undesired consistency is an inconsistency is out of tolerance for design 132.

Composite part manager 130 can send instructions 150 to manufacturing facility 122 to manufacture hollow composite body 152 using design 132. In this illustrative example, instructions 150 can be at least one of program code, data, design 132, or other information that can be used by manufacturing facility 122 to manufacture hollow composite body 152.

Figure 2:
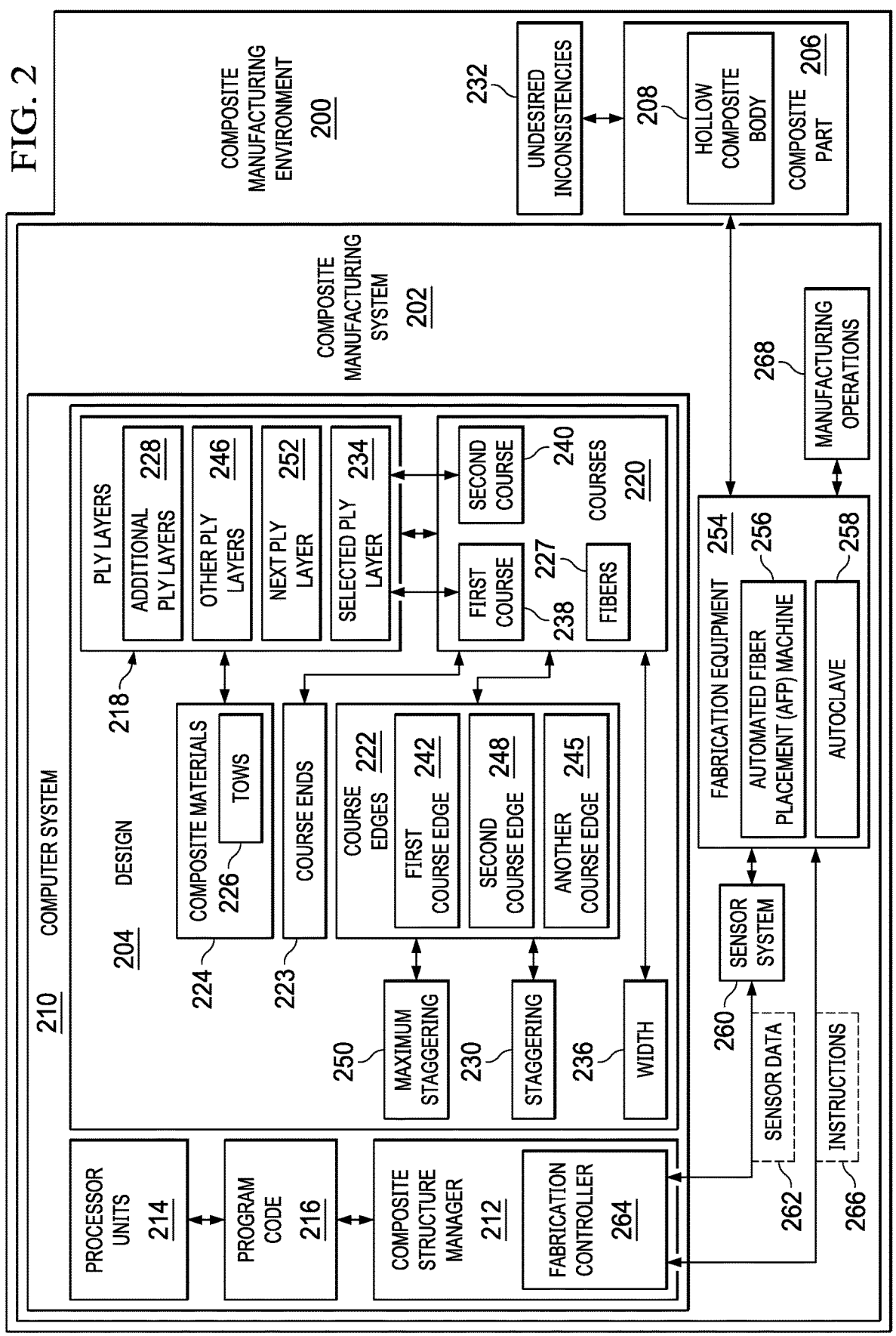
FIG. 2 is a block diagram of a composite manufacturing environment in accordance with an illustrative embodiment.

With reference now to FIG. 2, a block diagram of a composite manufacturing environment is depicted in accordance with an illustrative embodiment. In this illustrative example, composite manufacturing environment 200 includes components that can be implemented in hardware such as the hardware shown in network data processing system 100 in FIG. 1.

As depicted, composite manufacturing system 202 can generate design 204 for composite part 206. Composite part 206 can take the form of hollow composite body 208. Hollow composite body 208 can take a number of different forms. For example, hollow composite body 208 can be selected from a group comprising a submersible hull, a submarine hull, a wing, a rocket, a, aircraft fuselage, and other suitable composite structures having a hollow section.

In this illustrative example, hollow composite body 208 can have a cross-section in the form of a circle, an oval, a racetrack, an airfoil, a teardrop, or some other suitable cross-sectional shape.

In this illustrative example, composite manufacturing system 202 comprises computer system 210 and composite structure manager 212. Composite structure manager 212 is located in computer system 210.

Composite structure manager 212 can be implemented in software, hardware, firmware or a combination thereof. When software is used, the operations performed by composite structure manager 212 can be implemented in program code configured to run on hardware, such as a processor unit. When firmware is used, the operations performed by composite structure manager 212 can be implemented in program code and data and stored in persistent memory to run on a processor unit. When hardware is employed, the hardware can include circuits that operate to perform the operations in composite structure manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

As depicted, computer system 210 includes a number of processor units 214 that are capable of executing program code 216 implementing processes in the illustrative examples. As used herein a processor unit in the number of processor units 214 is a hardware device and is comprised of hardware circuits such as those on an integrated circuit that respond and process instructions and program code that operate a computer. When a number of processor units 214 execute program code 216 for a process, the number of processor units 214 is one or more processor units that can be on the same computer or on different computers. In other words, the process can be distributed between processor units on the same or different computers in a computer system. Further, the number of processor units 214 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, design 204 is a planner specification for the construction of an object or system such as composite part 206. Design 204 can include at least one of geometries, materials, processes for manufacturing, computer numerical control instructions, or any other information used to manufacture composite part 206, such as hollow composite body 208. In these illustrative examples, design 204 is in a form usable by computer system 210. For example, design 204 can be stored in a digital form such as in an electronic file or other data structure that is readable by computer system 210. In one illustrative example, design 204 is implemented as a computer-aided design (CAD).

In this illustrative example, composite structure manager 212 can analyze and adjust design 204 for hollow composite body 208. For example, composite structure manager 212 can operate to select ply layers 218 for hollow composite body 208. In this illustrative example, ply layers 218 comprise courses 220 having course edges 222.

In this example, a course edge in course edges 222 is parallel to fibers that form courses 220. Courses 220 also have course ends 223. The course end in course ends 223 is an end or edge where the fibers terminate or are cut. A course edge is longer than a course end in these illustrative examples.

In the illustrative example, course edges 222 are parallel to the fibers 227 that form courses 220 regardless of the orientation of courses 220. For example, if courses 220 an orientation of 0 degrees, the fibers in courses 220 have an orientation of 0 degrees. Course edges 222 are parallel to the fibers extending through courses 220 and also have an orientation of 0 degrees.

If the orientation of courses 220 are at 45 degrees, fibers 227 forming courses 220 also extend in a direction of 45 degrees. Course edges 222 are at 45° and parallel to the direction of fibers 227 forming courses 220. In other words, course edges 222 remain in parallel to fibers 227 when the orientations of courses 220 are changed in different designs for hollow composite body 208.

Ply layers 218 are comprised of composite materials 224. These composite materials can be, for example, a fiber reinforced polymer or fiber reinforced plastic comprising a polymer matrix reinforced with fiber. Composite materials 224 can be arranged in courses 220. In this illustrative example, tows 226 can be laid up to form courses 220. A course in courses 220 is a group of composite materials laid down. In the illustrative example, a course comprises a group of tows laid down by an automated fiber placement (AFP) machine in a single motion. In another illustrative example, a course can comprise a group of composite tapes laid down.

In this illustrative example, composite structure manager 212 positions course edges 222 between ply layers 218 throughout hollow composite body 208 to create staggering 230 of course edges 222 between ply layers 218 for design 204 of hollow composite body 208. Course edges 222 between courses 220 in a ply layer in ply layers 218 can form at least one of a gap, an overlap, or an abutted edge.

In this illustrative example, ply layers 218 can have the same orientation. For example, ply layers 218 can have an orientation selected from 0 degrees, 45 degrees, or some other orientation. A 0 degree orientation can result in courses 220 extending in a direction concentric to an axis extending centrally through hollow composite body 208.

In this illustrative example, additional ply layers 228 can be present in design 204 for hollow composite body 208. Additional ply layers 228 have a different orientation from ply layers 218. For example, ply layers 218 may have an orientation of 0 degrees, while additional ply layers 228 may have an orientation of 45 degrees or 90 degrees. Additional ply layers 228 can be interspersed within ply layers 218.

In the depicted example, a level of staggering 230 of course edges 222 between ply layers 218 reduces undesired inconsistencies 232 in fabricating the hollow composite body 208. Undesired inconsistencies 232 can be at least one of a wrinkle, a depression, a ridge, or some other inconsistency that is out of tolerance for hollow composite body 208. The tolerance specified in a specification, design 204, in some other location. In this illustrative example, staggering 230 of course edges 222 between ply layers 218 does not include course edges 222 in the same ply layer. In other words, staggering 230 is not determined with respect to course edges 222 in the same ply layer in ply layers 218.

In one illustrative example, positioning of course edges 222 between ply layers 218 throughout hollow composite body 208 in design 204 can be performed in a number of different ways. For example, the positioning of course edges 222 can be performed by composite structure manager 212 rotating selected ply layer 234 in ply layers 218 such that course edges 222 have increased staggering of between ply layers 218 in creating design 204 for hollow composite body 208. The rotating of selected ply layer 234 causes all of course edges 222 in selected ply layer 234 to change position or move relative to course edges 222 in other ply layers 246 in ply layers 218.

As another example of positioning, composite structure manager 212 can change width 236 of the courses 220 in selected ply layer 234 such that course edges 222 in selected ply layer 234 have an increased staggering of course edges 222 between ply layers 218. By changing with 236 of courses 220, a finer granularity in adjusting course edges 222 and selected ply layer 234 can be performed as compared to rotating selected ply layer 234. In other words, by adjusting width 236 of course edges 222 in selected ply layer 234, one or more of course edges 222 can be moved or adjusted in selected ply layer 234 relative to course edges 222 in other ply layers 246 in ply layers 218.

In the different illustrative examples, selected ply layer 234 can be selected any number of different ways. For example, selected ply layer 234 can be the innermost ply layer and ply layers 218. In another illustrative example, selected ply layer 234 can be the outermost by layer in ply layers 218. For example, selected ply layer 234 can be a newly added ply layer. In another illustrative example, selected ply layer 234 can be an existing ply layer within ply layers 218.

In the illustrative example, changing width 236 in selected ply layer 234 can be performed by composite structure manager 212 in a number of different ways. Composite structure manager 212 can add a number of tows 226 to first course 238 in selected ply layer 234. Composite structure manager 212 can remove the number of tows 226 from second course 240 in selected ply layer 234. This changing of the two courses, course edges 222 in selected ply layer 234 have increased staggering of course edges 222 between ply layers 218.

The selection of first course 238 for adding a number of tows 226 and second course 240 for removing the number of tows 226 can be performed in a number of different ways. For example, first course 238 can be selected by composite structure manager 212 as a course having first course edge 242 in selected ply layer 234 that has a minimum staggering 244 from another course edge 245 in course edges 222 in other ply layers 246 in ply layers 218. Composite structure manager 212 can add the number of tows 226 to first course 238 that is selected.

Further, the iteration does not necessarily need to be made for every ply layer in ply layers 218. For example, this iterative process can be halted if staggering 230 of course edges 222 in ply layers 218 meet some desired level or value for staggering 230. The desired level of staggering 230 can be based on when undesired inconsistencies 232 do not occur at an undesired level during fabrication of hollow composite body 208. The desired level staggering can be performed based on empirical data from fabricating hollow composite bodies with different levels of staggering 230. In another illustrative example, the desired level of staggering 230 can be determined through simulations.

In this example, the selection of second course 240 for removing the number of tows 226 can be performed in a number of different ways. For example, second course 240 can be selected by composite structure manager 212 as a course having second course edge 248 in selected ply layer 234 that has maximum staggering 250 from another course edge 245 in course edges 222 in other ply layers 246. Composite structure manager 212 can remove the number of tows 226 from second course 240 that is selected.

In this example, tows are added and removed from two courses in selected ply layer 234. In other illustrative examples, tows 226 can be added or removed from other number courses in selected ply layer 234. For example, courses can be added or removed from three courses, five courses, or some other number courses in selected ply layer 234.

In the illustrative of example, at least one of rotating selected ply layer 234 or changing width 236 of courses 220 and selected ply layer 234 can be performed by composite structure manager 212 to increase staggering 230 of course edges 222 between ply layers 218. In other words, staggering 230 can be increased throughout the different ply layers in ply 218 by composite structure manager 212 using one or both of these operations.

The steps of rotating a ply layer and adding and removing tows 226 from the ply layer can be repeated for next ply layer 252 in ply layers 218 in response to a desired level of staggering 230 being absent between course edges 222 in design 204 for hollow composite body 208. For example, composite structure manager 212 can select next ply layer 252 in ply layers 218 for processing. Composite structure manager 212 can rotate next ply layer 252 to increase staggering of course edges 222 between ply layers 218. Composite structure manager 212 can alternate the number of tows 226 between courses 220 in next ply layer 252 to increase staggering 230 of course edges 222 between ply layers 218 in response to rotating next ply layer 252 not resulting in the desired level of staggering 230 of course edges 222 between ply layers 218.

Composite structure manager 212 can repeat the selecting next ply layer 252, rotating next ply layer 252, and alternating the number of tows 226 between courses 220 in next ply layer 252 until all of ply layers 218 have been processed. In another illustrative example, composite structure manager 212 can halt repeating these steps when a desired level of staggering 230 is present in course edges 222 between ply layers 218.

In another illustrative example, composite structure manager 212 can iteratively process ply layers 218 to obtain a desired level of staggering 230 in ply layers 218 for hollow composite body 208. For example, composite structure manager 212 can select a ply layer in ply layers 218 in design 204 for hollow composite body 208 to form selected ply layer 234. Composite structure manager 212 can then stagger in an iterative manner course edges 222 between selected ply layer 234 in ply layers 218 and other ply layers 246 in ply layers 218. In other words, staggering or repositioning of course edges 222 in selected ply layer 234 is made with respect to course edges 222 in other ply layers 246.

This staggering is performed by composite structure manager 212 such that a result of increased staggering of the course edges 222 between ply layers 218 occurs. This result is used in a next iteration with another selected ply layer until a desired level of staggering to third occurs. This type of iterative process can be performed to stagger course edges 222 through rotation of selected ply layer 234, changing width 236 of courses 220 and selected ply layer 234, or a combination of the two.

When design 204 is completed, composite structure manager 212 can use design 204 to fabricate hollow composite body 208. In this illustrative example, composite structure manager 212 can control fabrication equipment 254 to fabricate hollow composite body 208. For example, fabrication equipment 254 can include automated fiber placement (AFP) machine 256 which is controlled by composite structure manager 212 to lay up composite materials 224 such as tows 226 in courses 220 using design 204 to create ply layers 218 for hollow composite body 208. In this illustrative example, a course in courses 220 is formed by each pass of automated fiber placement machine 256.

In this illustrative example, fabrication equipment 254 can also include autoclave 258. Composite structure manager 212 can control autoclave 258 to cure ply layers 218 laid up using design 204 to create hollow composite body 208. In this depicted example, staggering of course edges 222 between ply layers 218 results in a reduction in undesired inconsistencies 232 in the hollow composite body occurring of the ply layers.

In this illustrative example, composite structure manager 212 can control the operation of fabrication equipment 254 using sensor system 260. As depicted, sensor system 260 is a physical hardware system that detects information about fabrication equipment 254, the environment around fabrication equipment 254, or both, to generate sensor data 262. Sensor system 260 can be comprised of at least one of a camera system, a laser sensor, an ultrasonic sensor, a light detection and ranging scanner, an encoder, a rotary encoder, a temperature sensor, a pressure sensor, an accelerometer, or some other suitable type of sensor.

Sensor system 260 can generate sensor data 262 about the operation of fabrication equipment 254. As depicted, sensor data 262 can be used by fabrication controller 264 in composite structure manager 212 to control the operation of fabrication equipment 254. In this illustrative example, a portion or all of sensor system 260 can be associated or connected to fabrication equipment 254.

In this illustrative example, fabrication controller 264 can use sensor data 262 to generate instructions 2845. Instructions 266 can be used to cause fabrication equipment 254 to perform a number of manufacturing operations 268. In this illustrative example, instructions 2845 can comprise at least one of commands, data, or other information that can control the operation of fabrication equipment 254.

In one illustrative example, one or more technical solutions are present that overcome a technical problem with reducing undesired inconsistencies in hollow composite bodies. As a result, one or more technical solutions can provide a technical effect reducing the time and effort needed to obtain a level of staggering between course edges imply layers to reduce undesired inconsistencies for fabricating composite hollow bodies.

Computer system 210 can be configured to perform at least one of the steps, operations, or actions described in the different illustrative examples using software, hardware, firmware or a combination thereof. As a result, computer system 210 operates as a special purpose computer system in which composite structure manager 212 in computer system 210 enables a process for obtaining a desired level of staggering in a design for a composite part such as a hollow composite body. In particular, composite structure manager 212 transforms computer system 210 into a special purpose computer system as compared to currently available general computer systems that do not have composite structure manager 212.

In the illustrative example, the use of composite structure manager 212 in computer system 210 integrates processes into a practical application for method designing a composite hollow body that increases the performance of computer system 210. In other words, composite structure manager 212 in computer system 210 is directed to a practical application of processes integrated into composite structure manager 212 in computer system 210 enables designing a composite hollow body in a manner that obtains staggering of course edges in a manner that reduces undesired inconsistencies when fabricating a composite hollow body as compared to current techniques. In this illustrative example, composite structure manager 212 in computer system 210 enables reducing the time needed to create a design for composite hollow body that produces undesired inconsistencies. The use of composite structure manager 212 can reduce or avoid the amount of rework may be needed when undesired inconsistencies occur. Further, the use of composite structure manager 212 in computer system 210 can reduce the need for a human operator to go back and revise a design.

The illustration of composite manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, composite structure manager 212 can be used to manufacture other composite parts in addition to hollow composite body 208. As another illustrative example, fabrication equipment 254 can include other equipment in addition to automated fiber placement machine 256 and autoclave 258 and other types of composite materials can be used in addition to or in place of tows 226. For example, composite tape can be laid up in courses 220 by automated tape laying (ATL) machine in fabrication equipment 254.

As another example, inlaying up ply layers for manufacturing hollow composite body 208. A first portion of ply layers 218 can be laid up and cured. Then a second portion of the ply layers 218 can be laid up and cured using design 204. In other words, the layout and curing of ply layers can occur all at once or incrementally.

Figure 3:
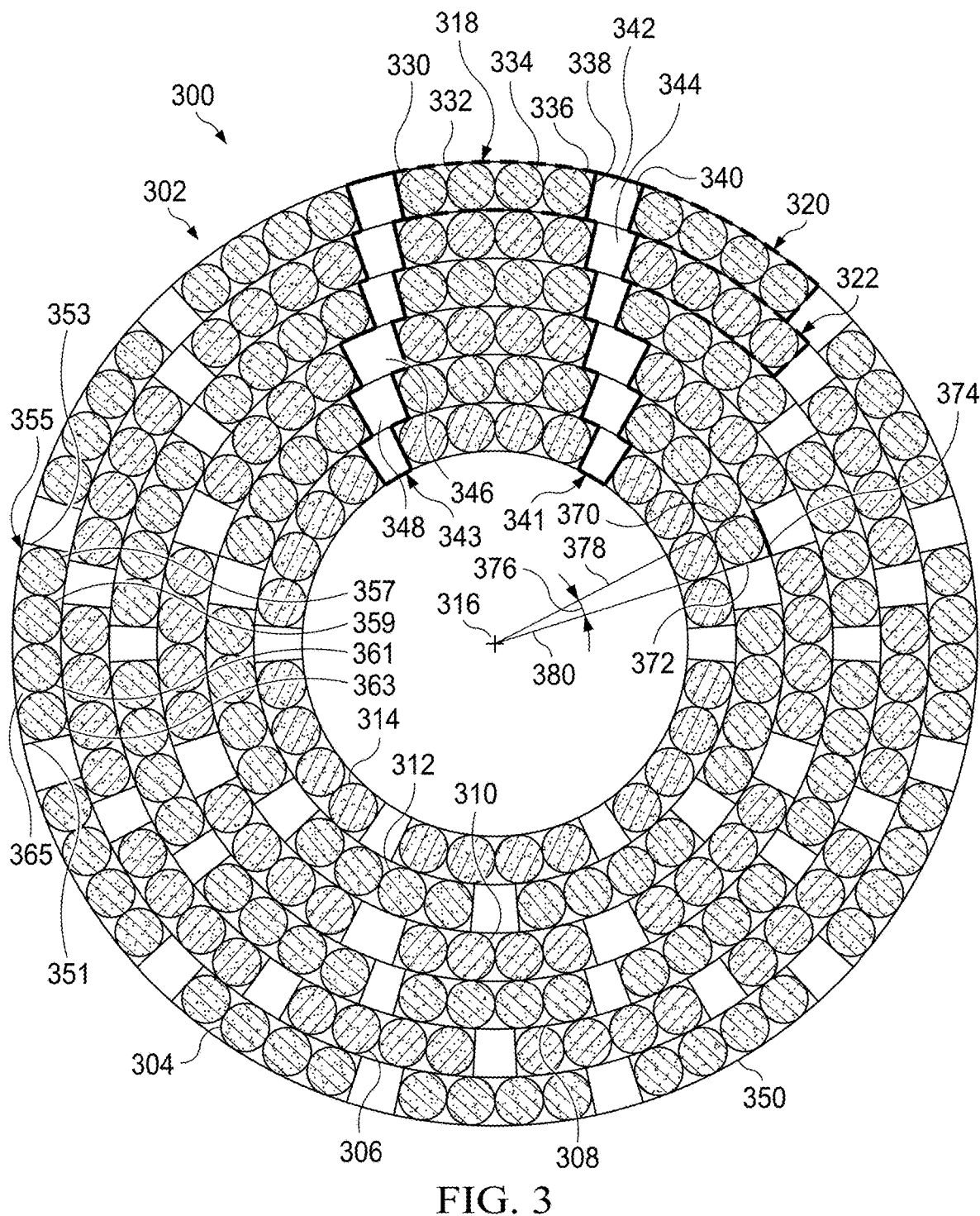
FIG. 3 is an illustration of a cross-section of ply layers in a design for a submersible hull in accordance with an illustrative embodiment.

With reference next to FIG. 3, an illustration of a cross-section of ply layers in a design for a submersible hull is depicted in accordance with an illustrative embodiment. In this depicted example, the design for submersible hull 300 is an example of hollow composite body 208 shown in block form in FIG. 2. In this illustrative example, submersible hull 300 is comprised of ply layers 302, such as ply layer 304, ply layer 306, ply layer 308, ply layer 310, and ply layer 314.

As depicted, ply layers 302 have an orientation of 0 degree. Courses in ply layers 302 extend in a direction parallel with axis 316 that extends centrally within submersible hull 300. For example, ply layer 304 is comprised of courses such as course 318 and course 320. Ply layer 306 has, for example, courses such as course 322. In this illustrative example, each course is formed from a single pass of a head of an automated fiber placement (AFP) machine used to lay up composite materials such as tows.

Each course is comprised of a number of tows, which also have a 0 degree orientation. For example, course 318 has tow 330, tow 332, tow 334, and tow 336.

As depicted, the courses have course edges in which gaps are present between the course edges. For example, course 318 has course edge 338, and course 320 has course edge 340 with gap 342 present between these two course edges. In other illustrative examples, an overlap can be present between course edges or course edges may abut or touch each other.

In this illustrative example, the staggering of course edges is not at a desirable level. In this illustrative example, when gaps are present between course edges, the measurement of the staggering ply edges can be measured based on the arcs of gaps measured relative to each other in different ply layers from axis 316.

For example, the staggering of these course edges result in an overlap between gaps. For example, an in undesired overlap of gaps is present in section 341 and section 343. For example, an overlap is present between gap 342 and gap 344. As another example, an overlap is present between gap 346 in gap 348.

In this illustrative example, the staggering between course edges or gaps can be determined based on the angle or arc between two course edges or two to gaps relative to axis 316. For example, the staggering between course edge 370 and course edge 372 can be arc 374 or angle 376 between ray 378 and ray 380 extending from axis 316.

These overlaps, such as in section 341 and section 343, can result in undesired inconsistencies when ply layers 302 are laid up and cured to form submersible hull 300. For example, the undesired consistency can involve one or more wrinkles (not shown) on surface 350 of submersible hull 300. Composite structure manager 212 (not shown) in FIG. 2 can operate to increase the staggering of course edges that results in less overlap between gaps in the different ply layers. As depicted in this example, the circumference for each ply layer is greater ply layer closer to axis 316. For example, ply layer 304 is a greater circumference than ply layer 306. In other words, the circumference of ply layers increases as the ply layers progress radially outward away from axis 316.

Additionally, course edges extend in parallel with the fibers in the tows laid up to form the courses. For example, course edge 351 and course edge 353 for course 355 extends longitudinally in parallel to axis 316 as well as in parallel to fibers in tow 357, tow 359, tow 361, and tow 362 laid up longitudinally in parallel to axis 316. As depicted in this view, course 355 has course end 365, which is a side of course 355 where the fibers terminate. In the illustrative examples, course edges are greater in length and course ends.

Figure 4:
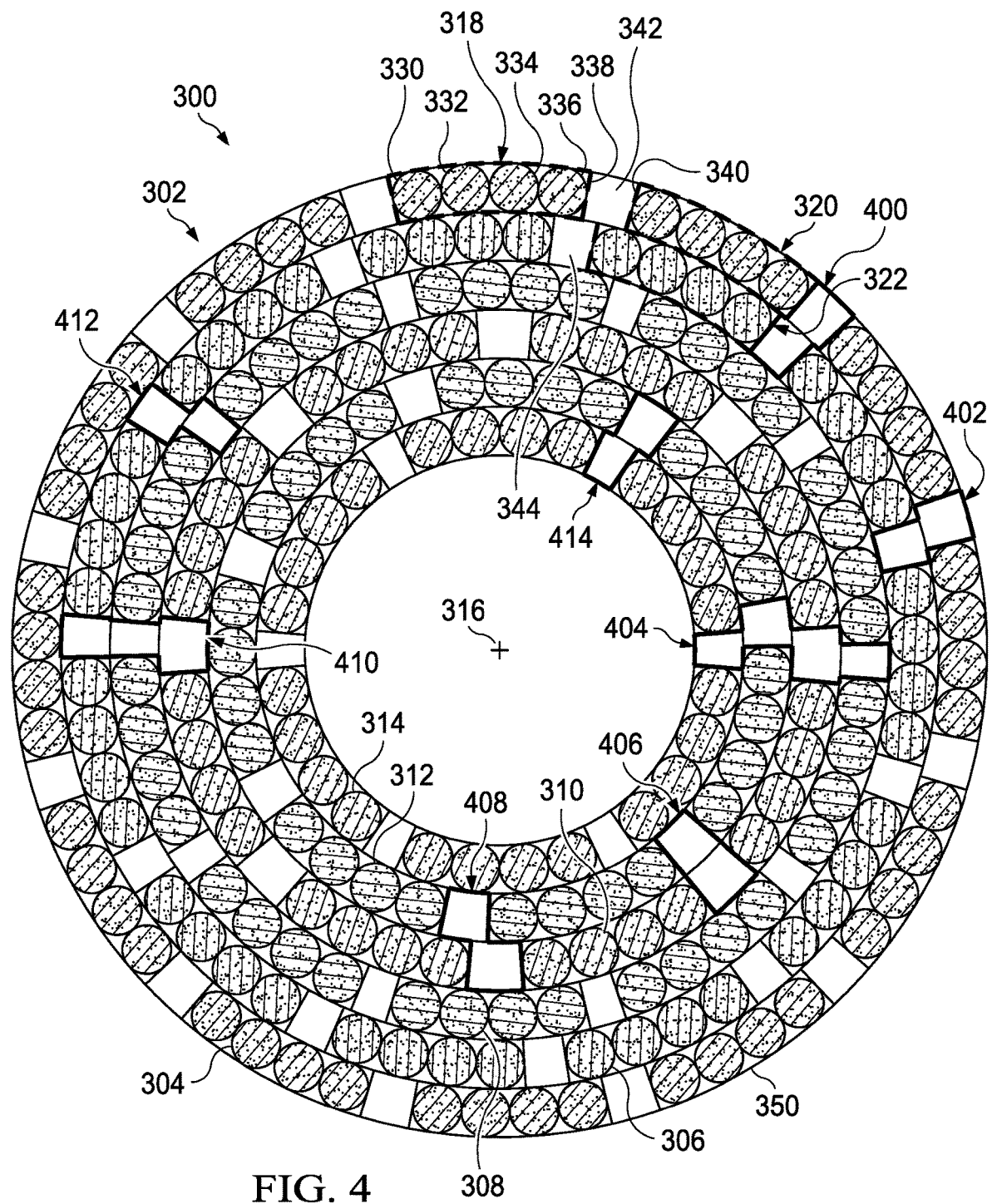
FIG. 4 is an illustration of a cross-section of rotated ply layers in design for a submersible hull in accordance with an illustrative embodiment.

Turning next to FIG. 4, an illustration of a cross-section of rotated ply layers in design for a submersible hull is depicted in accordance with an illustrative embodiment. In the illustrative examples, the same reference numeral may be used in more than one figure. This reuse of a reference numeral in different figures represents the same element in the different figures.

In this illustrative example, ply layers 302 and been rotated relative to each other to increase the staggering of ply edges. This increase in the staggering of course edges has resulted in a reduction in the overlap of gaps such as those previously seen in section 341 and section 343 in FIG. 3. Although the staggering of course edges has been increased, some overlap of gaps between course edges still remains as depicted in this figure. For example, a staggering of gaps is still present in section 400, section 402, section 404, section 406, section 408, section 410, and section 412. The depth of the overlap of gaps is reduced in a manner that can reduce undesired inconsistencies as compared to the overlap of gaps depicted in FIG. 3. Depending on the particular design and desired level staggering, additional operations can be performed to further increase the staggering of ply layers 302.

Figure 5:
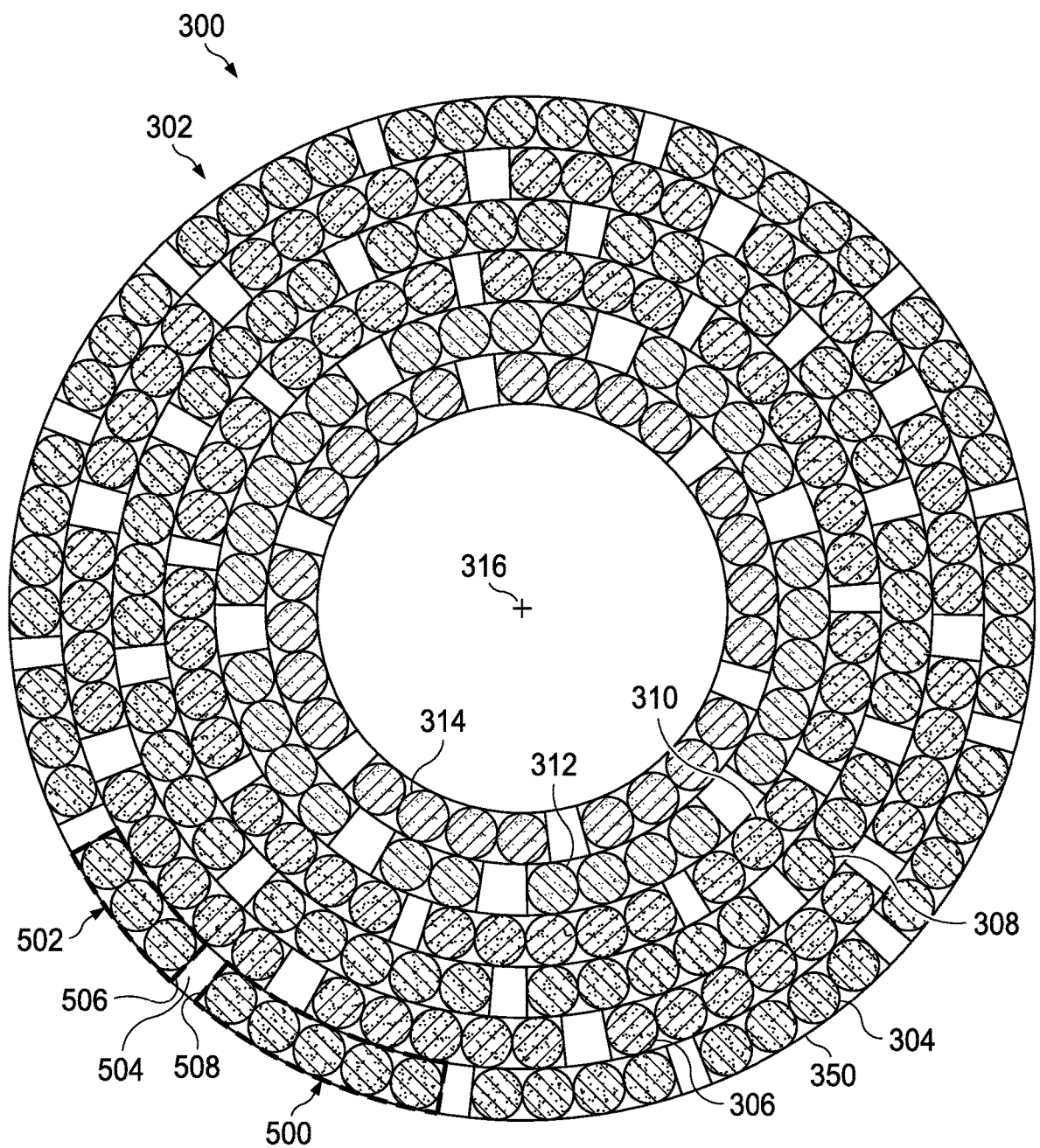
FIG. 5 is an illustration of rotated courses and manipulated tows for ply layers in a design for submersible hull in accordance with an illustrative embodiment.

With reference to FIG. 5, an illustration of rotated courses and manipulated tows for ply layers in a design for submersible hull is depicted in accordance with an illustrative embodiment. With this reduced staggering from rotating ply layers 302 in FIG. 4, composite structure manager 212 can further reduce staggering through changing course widths as depicted in this figure.

In this illustrative example, the width of courses within ply layers 302 have been changed to increase the staggering of ply edges between ply layers 302. The width of courses can be adjusted by increasing the width or decreasing the width of courses in a manner that maintains a consistent circumference for each ply layer in ply layers 302. This adjustment can be used to shift the location of ply edges in one or more courses. This type of adjustment provides a greater granularity in adjusting course edges as compared to rotating a ply layer. In other words, this type of adjustment may adjust the position of one or more course edges in a ply layer while rotating the ply layer adjusts the position of all of the course edges in the ply layer.

For example, a tow has been removed from course 500 and added to course 502 in ply layer 304. As a result, course 500 has three tows, while course 502 has five tows. This adjustment to these two courses results in moving the position of course edge 504 and course edge 506, which in turn causes 508 this position of gap to move. As a result, if other tows are not moved, only these For example, one or more tows can be removed from one course and added to another course in a ply layer. When gaps are present between ply edges, a tow in a course in a ply layer may be in some cases added to a course without removing a tow from another course depending on the size of gaps. In another example, a tow may be removed from a course without adding a tow to another course in the ply layer.

As depicted, the design of submersible hull 300 in this figure now has a desired level of staggering of course edges between the ply layers. The staggering of ply edges and gaps between ply edges are such that undesired overlaps have been reduced to a level that reduces undesired inconsistencies when submersible hull 300 is fabricated using the design as depicted in this figure.

Illustration of the design for submersible hull 300 in FIGS. 3-5 and provided as an illustration of one manner in which a submersible hull can be implemented. This illustration is not meant to limit the manner in which other illustrative examples can be implemented. For example, other number of ply layers can be used in addition to six ply layers. In the depicted example, six ply layers were selected to illustrate features of the illustrative example. In other illustrative examples, a submersible hull may have 70, 100, 135, or some other number of ply layers.

Further, other ply layers can be present but not shown in addition to ply layers 302. For example, other ply layers in other directions other than 0° can be present in the design for submersible hull 300. These ply layers are not shown to avoid obscuring the presentation of features in the illustrative of examples.

Further, the staggering can be performed for ply layers laid up in another orientation other than 0 degrees. In another illustrative example, the courses be laid up at 45 degrees rather than longitudinally at 0 degrees as depicted in FIGS. 3-5. With this orientation, course edges are oriented at 45 degrees and are still in parallel with the fibers forming the courses. In other words, tows for disorientation of the courses are laid up at 45 degrees such that the fibers are oriented at 45 degrees in parallel with the course edges that are also oriented at 45 degrees. The staggering perform for course edges can be performed in the same manner for this and other orientations of course edges.

Figure 6:
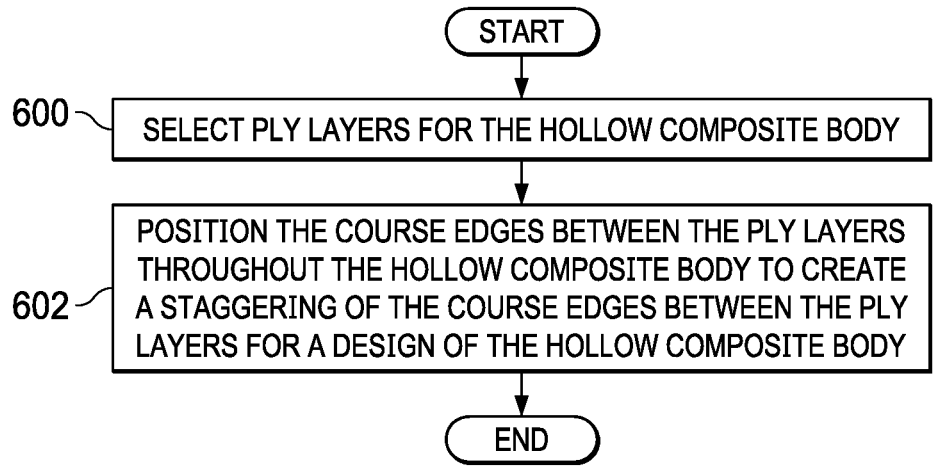
FIG. 6 is an illustration of a flowchart of a process for designing a hollow composite body in accordance with an illustrative embodiment.

Turning next to FIG. 6, an illustration of a flowchart of a process for designing a hollow composite body is depicted in accordance with an illustrative embodiment. The process in FIG. 6 can be implemented in hardware, software, or both. When implemented in software, the process can take the form of program code that is run by one of more processor units located in one or more hardware devices in one or more computer systems. For example, the process can be implemented in composite structure manager 212 in computer system in FIG. 2.

The process begins by selecting ply layers for the hollow composite body (operation 600). In operation 600, the ply layers comprise courses having course edges. The process positions the course edges between the ply layers throughout the hollow composite body to create a staggering of the course edges between the ply layers for a design of the hollow composite body (operation 602). The process terminates thereafter.

In operation 602, a level of the staggering of the course edges between the ply layers reduces undesired inconsistencies in fabricating the hollow composite body. In one illustrative example, an absence of any overlap between course edges or gaps may be standard for a desired level of staggering that reduces undesired inconsistencies. In another illustrative example, an overlap between the course edges for the courses throughout the ply layers occurring every n layers may be acceptable depending on the amount of reduction in undesired consistencies. This overlap may also be determined based on gaps between course edges.

Figure 7:
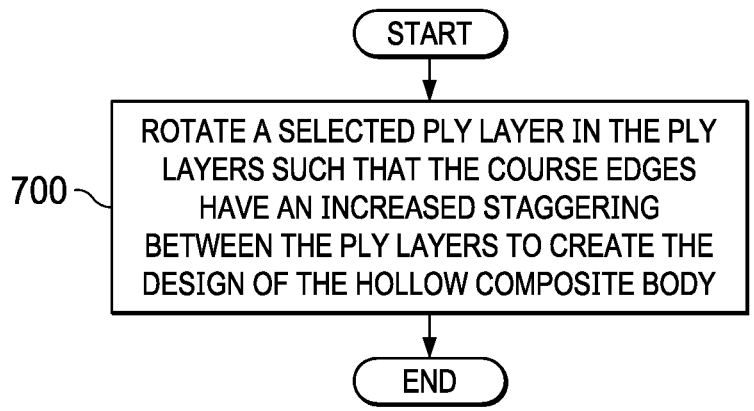
FIG. 7 is an illustration of a flowchart of a process for positioning course edges in accordance with an illustrative embodiment.

With reference to FIG. 7, an illustration of a flowchart of a process for positioning course edges is depicted in accordance with an illustrative embodiment. The process in FIG. 7 is an example of an implementation for operation 602 in FIG. 6.

The process rotates a selected ply layer in the ply layers such that the course edges have an increased staggering between the ply layers to create the design of the hollow composite body (operation 700). The process terminates thereafter.

Figure 8:
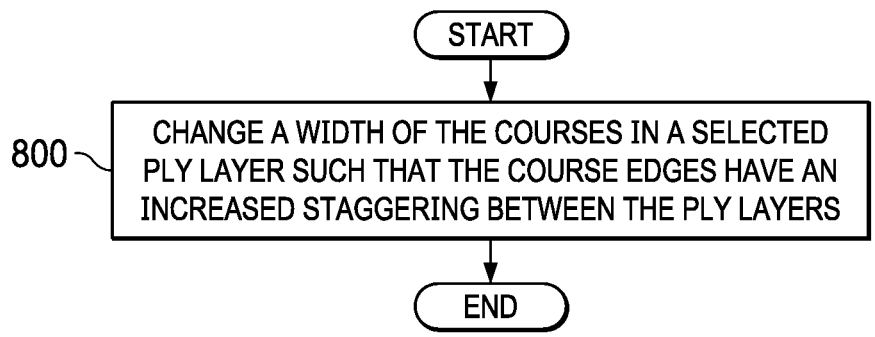
FIG. 8 is an illustration of a flowchart of a process for positioning course edges in accordance with an illustrative embodiment.

Turning now to FIG. 8, an illustration of a flowchart of a process for positioning course edges is depicted in accordance with an illustrative embodiment. The process in FIG. 8 is an example of an implementation for operation 602 in FIG. 6.

The process changes a width of the courses in a selected ply layer such that the course edges have an increased staggering between the ply layers (operation 800). The process terminates thereafter.

Figure 9:
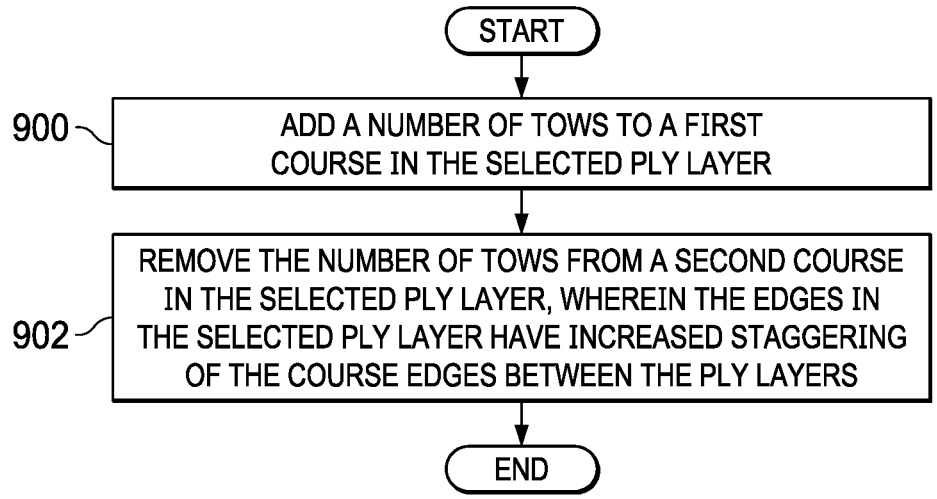
FIG. 9 is an illustration of a flowchart of a process for changing course widths in accordance with an illustrative embodiment.

In FIG. 9, an illustration of a flowchart of a process for changing course widths is depicted in accordance with an illustrative embodiment. The process in FIG. 9 is an example of an implementation for operation 800 in FIG. 8.

The process begins by adding a number of tows to a first course in the selected ply layer (operation 900). The process removes the number of tows from a second course in the selected ply layer, wherein the edges in the selected ply layer have increased staggering of the course edges between the ply layers (operation 902). The process terminates thereafter.

Figure 10:
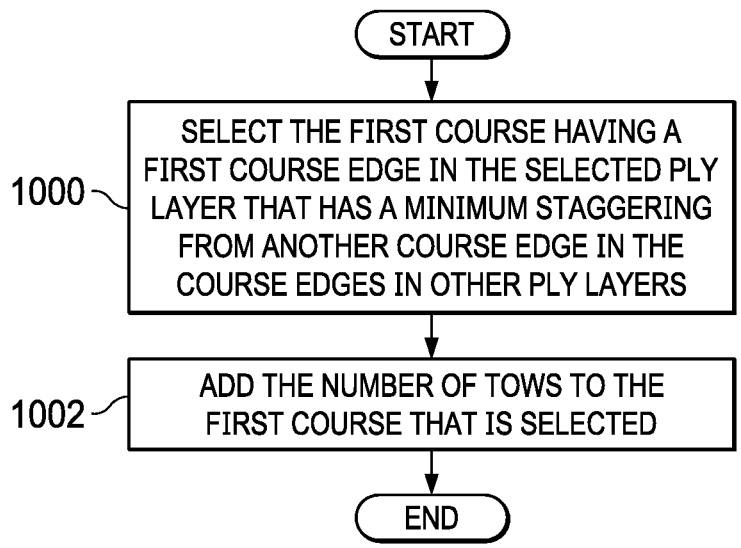
FIG. 10 is an illustration of a flowchart of a process for changing course widths in accordance with an illustrative embodiment.

With reference to FIG. 10, an illustration of a flowchart of a process for changing course widths is depicted in accordance with an illustrative embodiment. The process in FIG. 10 is an example of an implementation for operation 900 in FIG. 9.

The process selects the first course having a first course edge in the selected ply layer that has a minimum staggering from another course edge in the course edges in other ply layers (operation 1000). The process adds the number of tows to the first course that is selected (operation 1002). The process terminates thereafter.

Figure 11:
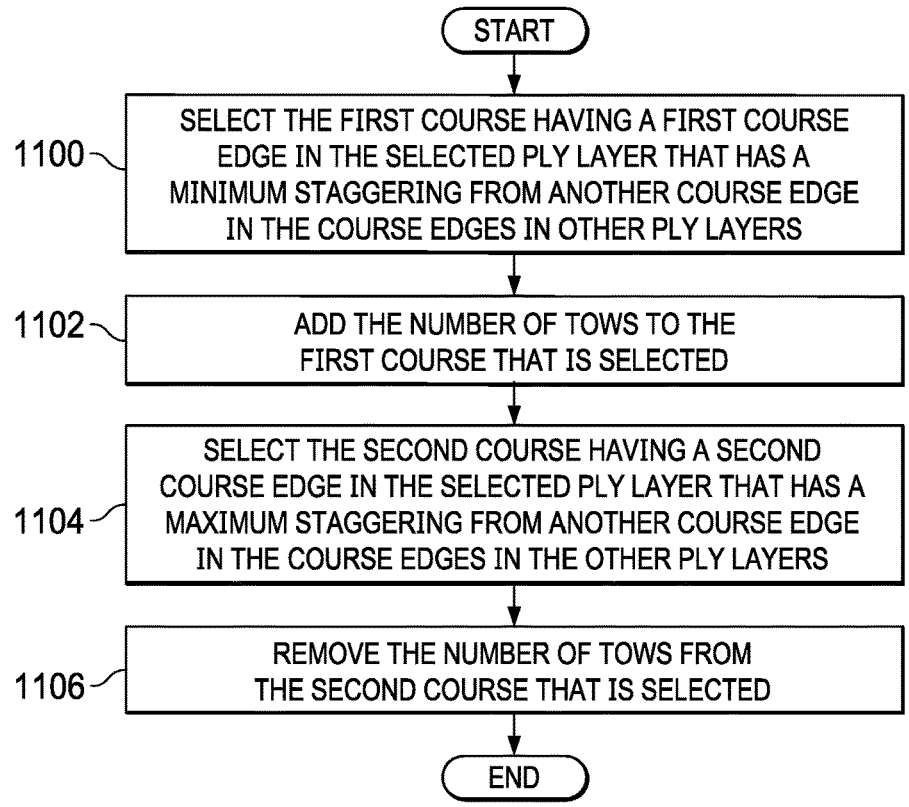
FIG. 11 is an illustration of a flowchart of a process for changing course widths in accordance with an illustrative embodiment.

Turning to FIG. 11, an illustration of a flowchart of a process for changing course widths is depicted in accordance with an illustrative embodiment. The process in FIG. 11 is an example of an implementation for operation 900 in FIG. 9.

The process begins by selecting the first course having a first course edge in the selected ply layer that has a minimum staggering from another course edge in the course edges in other ply layers (operation 1100). The process adds the number of tows to the first course that is selected (operation 1102).

The process selects the second course having a second course edge in the selected ply layer that has a maximum staggering from another course edge in the course edges in the other ply layers (operation 1104). The process removes the number of tows from the second course that is selected (operation 1106). The process terminates thereafter.

Figure 12:
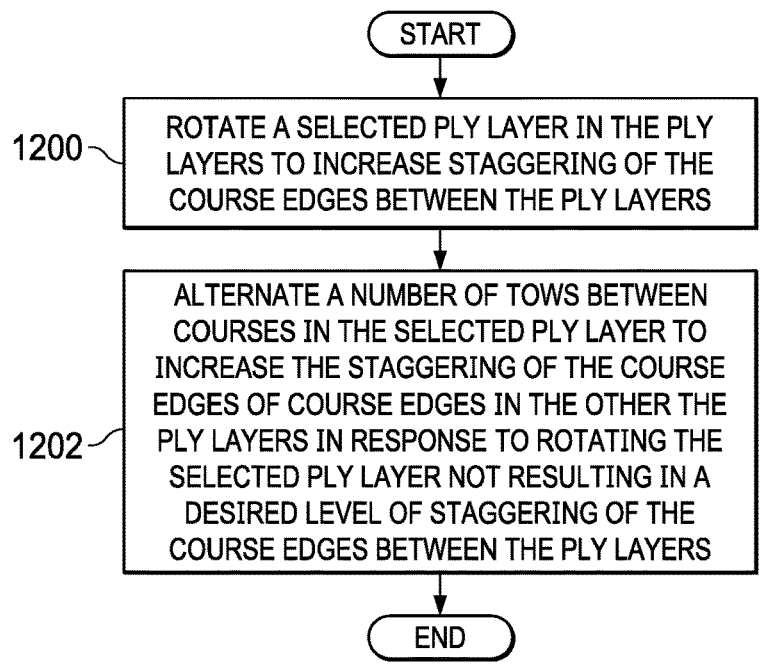
FIG. 12 is an illustration of a flowchart of a process for positioning course edges in accordance with an illustrative embodiment.

Turning now to FIG. 12, an illustration of a flowchart of a process for positioning course edges is depicted in accordance with an illustrative embodiment. The process in FIG. 12 is an example of an implementation for operation 602 in FIG. 6.

The process begins by rotating a selected ply layer in the ply layers to increase staggering of the course edges between the ply layers (operation 1200). The process alternates a number of tows between courses in the selected ply layer to increase the staggering of the course edges of course edges in the other the ply layers in response to rotating the selected ply layer not resulting in a desired level of staggering of the course edges between the ply layers (operation 1202). This process can be repeated for the next ply layer in the file layers in response to a desired level of staggering being absent between the course edges. In the illustrative example, the next ply level layer is the ply layer that touches the ply layer that has been processed by rotating or alternating tows.

Figure 13:
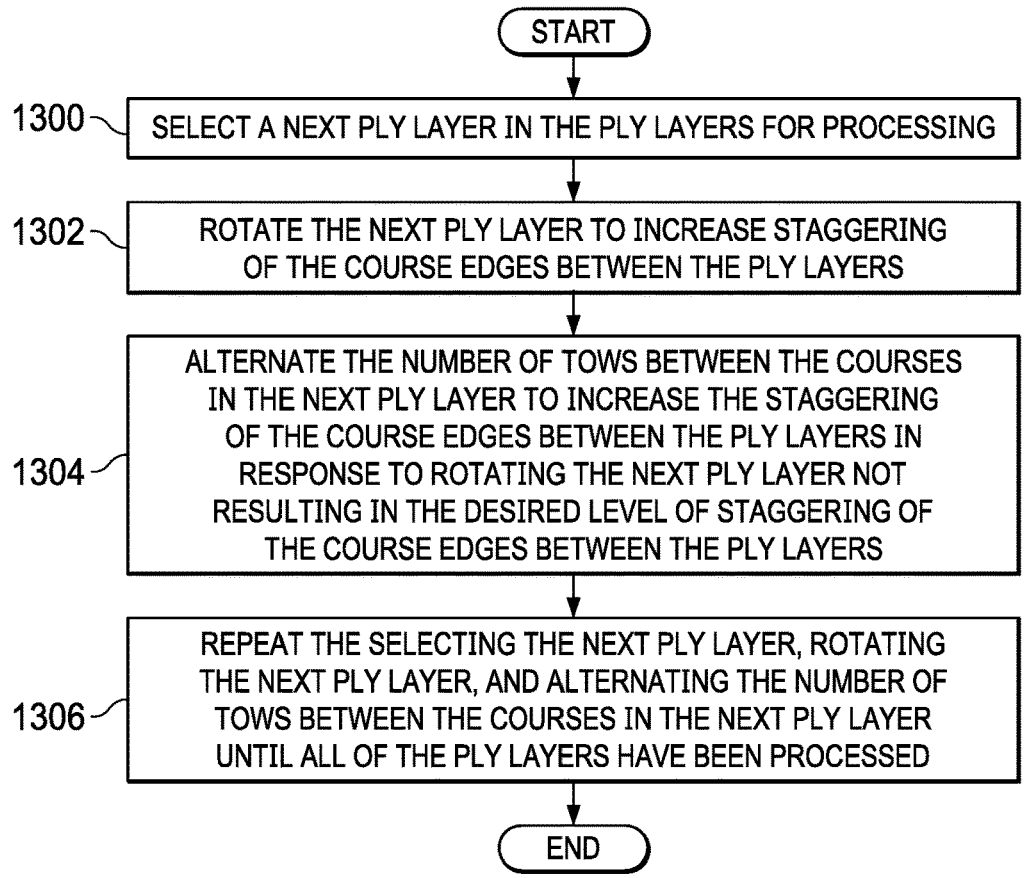
FIG. 13 is an illustration of a flowchart of a process for positioning course edges in accordance with an illustrative embodiment.

With reference next to FIG. 13, an illustration of a flowchart of a process for positioning course edges is depicted in accordance with an illustrative embodiment. The process in FIG. 13 is an example of an implementation for operation 602 in FIG. 6.

The process begins by selecting a next ply layer in the ply layers for processing (operation 1300). The process rotates the next ply layer to increase staggering of the course edges between the ply layers (operation 1302). The process alternates the number of tows between the courses in the next ply layer to increase the staggering of the course edges between the ply layers in response to rotating the next ply layer not resulting in the desired level of staggering of the course edges between the ply layers (operation 1304).

The process repeats the selecting the next ply layer, rotating the next ply layer, and alternating the number of tows between the courses in the next ply layer until all of the ply layers have been processed (operation 1306). The process terminates thereafter.

Figure 14:
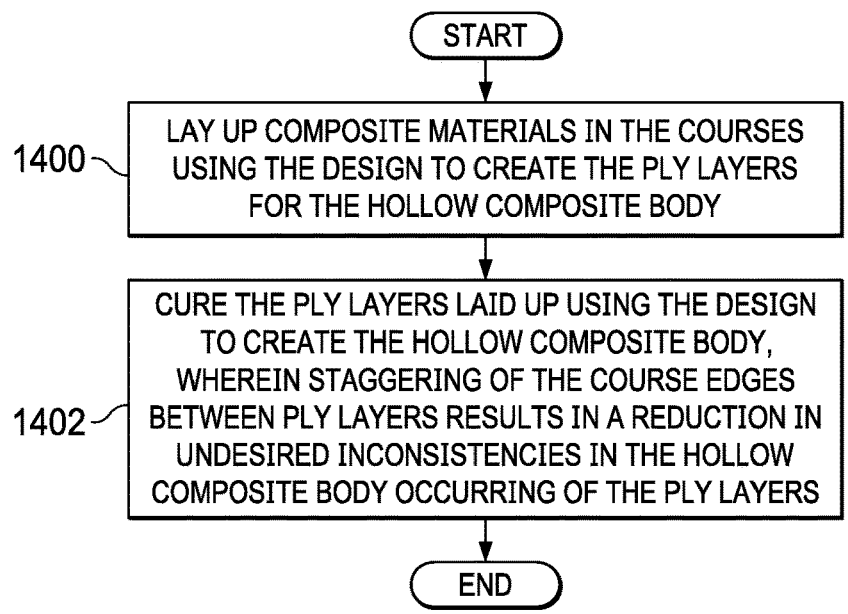
FIG. 14 is an illustration of the flowchart of a process for manufacturing a hollow composite body in accordance with an illustrative embodiment.

Turning to FIG. 14, an illustration of the flowchart of a process for manufacturing a hollow composite body is depicted in accordance with an illustrative embodiment. The process illustrated in FIG. 14 is an example of additional steps that can be performed after the design of the composite hollow body is completed in the process in FIG. 6.

The process begins by laying up composite materials in the courses using the design to create the ply layers for the hollow composite body (operation 1400). In operation 1400, the composite materials laid out can be, for example, tows.

The process cures the ply layers laid up using the design to create the hollow composite body, wherein staggering of the course edges between ply layers results in a reduction in undesired inconsistencies in the hollow composite body occurring of the ply layers (operation 1402). The process terminates thereafter.

Figure 15:
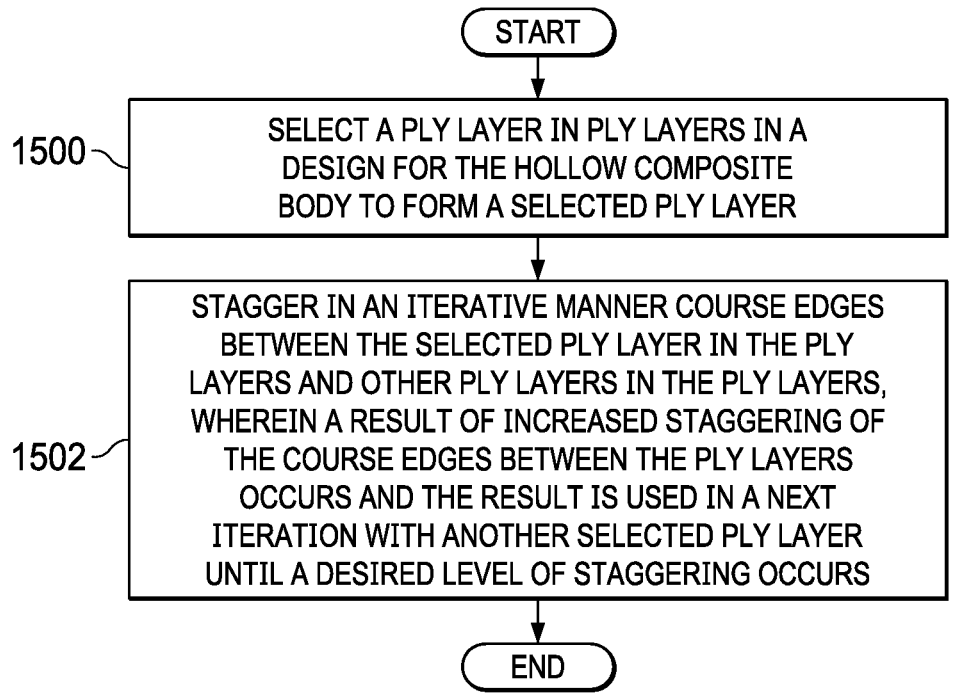
FIG. 15 is an illustration of a flowchart of a process for designing a hollow composite body in accordance with an illustrative embodiment.

Turning next to FIG. 15, an illustration of a flowchart of a process for designing a hollow composite body is depicted in accordance with an illustrative embodiment. The process in FIG. 15 can be implemented in hardware, software, or both. When implemented in software, the process can take the form of program code that is run by one of more processor units located in one or more hardware devices in one or more computer systems. For example, the process can be implemented in composite structure manager 212 in computer system in FIG. 2.

The process begins by selecting a ply layer in ply layers in a design for the hollow composite body to form a selected ply layer (operation 1500). The process staggers in an iterative manner course edges between the selected ply layer in the ply layers and other ply layers in the ply layers, wherein a result of increased staggering of the course edges between the ply layers occurs and the result is used in a next iteration with another selected ply layer until a desired level of staggering occurs (operation 1502). The process terminates thereafter.

In this illustrative example, iteration moves from one ply layer to the adjacent next ply layer. In other words, the process does not skip over ply layers during processing as long as the ply layers have the same orientation. In the design, other ply layers are present in addition to the one-day process in FIG. 15, those ply layers are not considered during this process.

Figure 16:
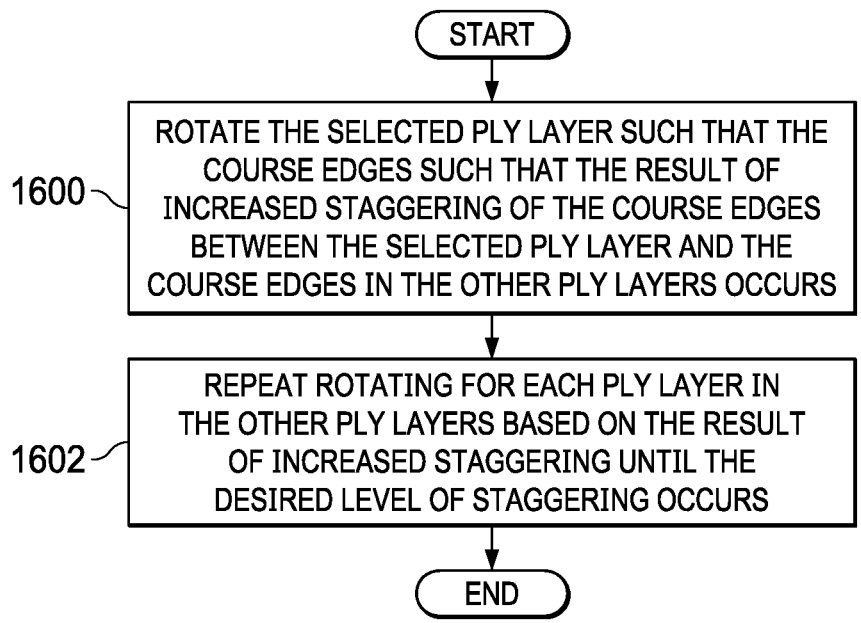
FIG. 16 is an illustration of a flowchart of process for staggering in an iterative manner course edges in accordance with an illustrative embodiment.

With reference now to FIG. 16, an illustration of a flowchart of process for staggering in an iterative manner course edges is depicted in accordance with an illustrative embodiment. The process illustrated in FIG. 16 is an example of an implementation for operation 1502 in FIG. 15.

The process begins by rotating the selected ply layer such that the course edges such that the result of increased staggering of the course edges between the selected ply layer and the course edges in the other ply layers occurs (operation 1600). The process repeats rotating for each ply layer in the other ply layers based on the result of increased staggering until the desired level of staggering occurs (operation 1602). The process terminates thereafter.

Figure 17:
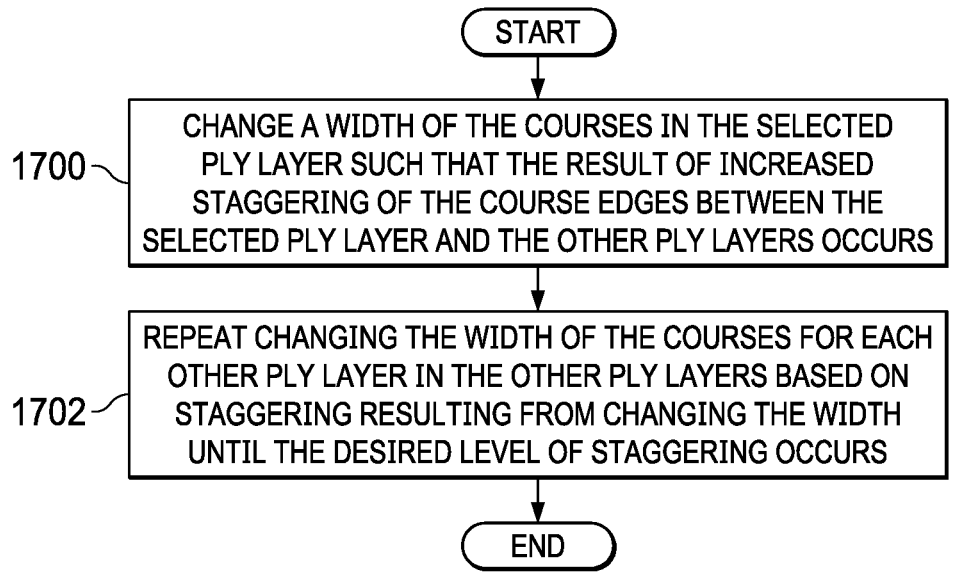
FIG. 17 is an illustration of a flowchart of process for staggering in an iterative manner course edges in accordance with an illustrative embodiment.

In FIG. 17, an illustration of a flowchart of process for staggering in an iterative manner course edges is depicted in accordance with an illustrative embodiment. The process illustrated in FIG. 17 is an example of an implementation for operation 1502 in FIG. 15.

Figure 18:
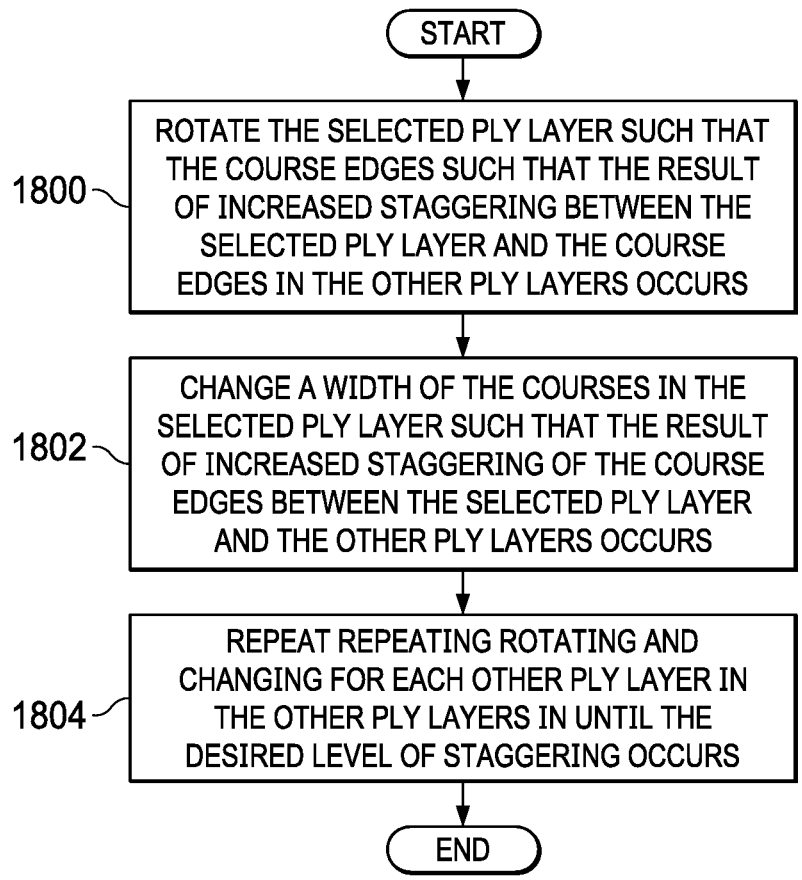
FIG. 18 is an illustration of a flowchart of process for staggering in an iterative manner course edges in accordance with an illustrative embodiment.

The process begins by changing a width of the courses in the selected ply layer such that the result of increased staggering of the course edges between the selected ply layer and the other ply layers occurs (operation 1700). The process repeats changing the width of the courses for each other ply layer in the other ply layers based on staggering resulting from changing the width until the desired level of staggering occurs (operation 1702). The process terminates thereafter With reference to FIG. 18, an illustration of a flowchart of process for staggering in an iterative manner course edges is depicted in accordance with an illustrative embodiment. The process illustrated in FIG. 18 is an example of an implementation for operation 1502 in FIG. 15.

The process begins by rotating the selected ply layer such that the course edges such that the result of increased staggering between the selected ply layer and the course edges in the other ply layers occurs (operation 1800). The process changes a width of the courses in the selected ply layer such that the result of increased staggering of the course edges between the selected ply layer and the other ply layers occurs (operation 1802).

The process repeats repeating rotating and changing for each other ply layer in the other ply layers in until the desired level of staggering occurs (operation 1804). The process terminates thereafter.

Figure 19A:
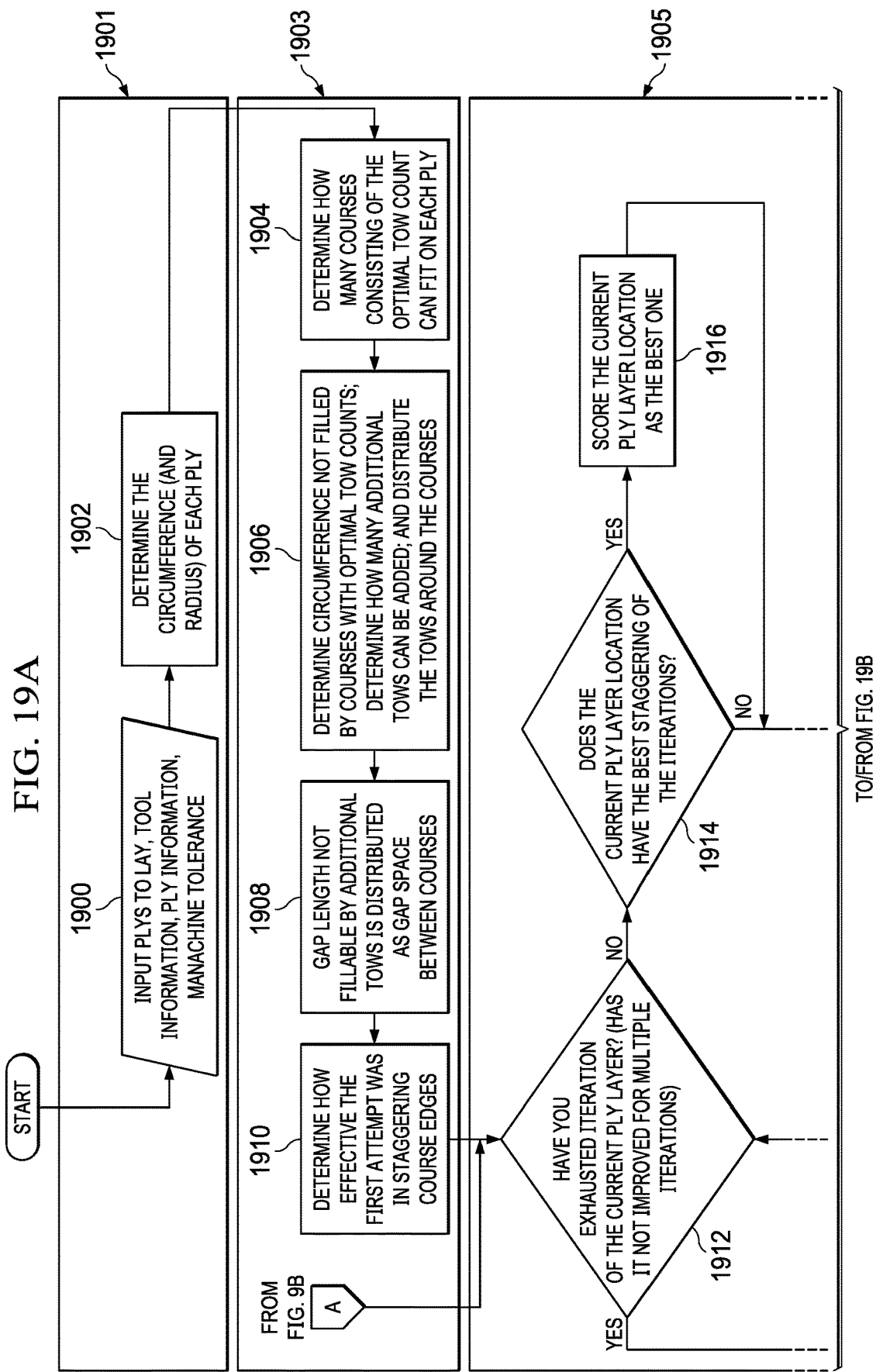
FIGS. 19A and 19B are an illustration of a flowchart of process for creating a design for a hollow composite body in accordance with an illustrative embodiment.
Figure 19B:
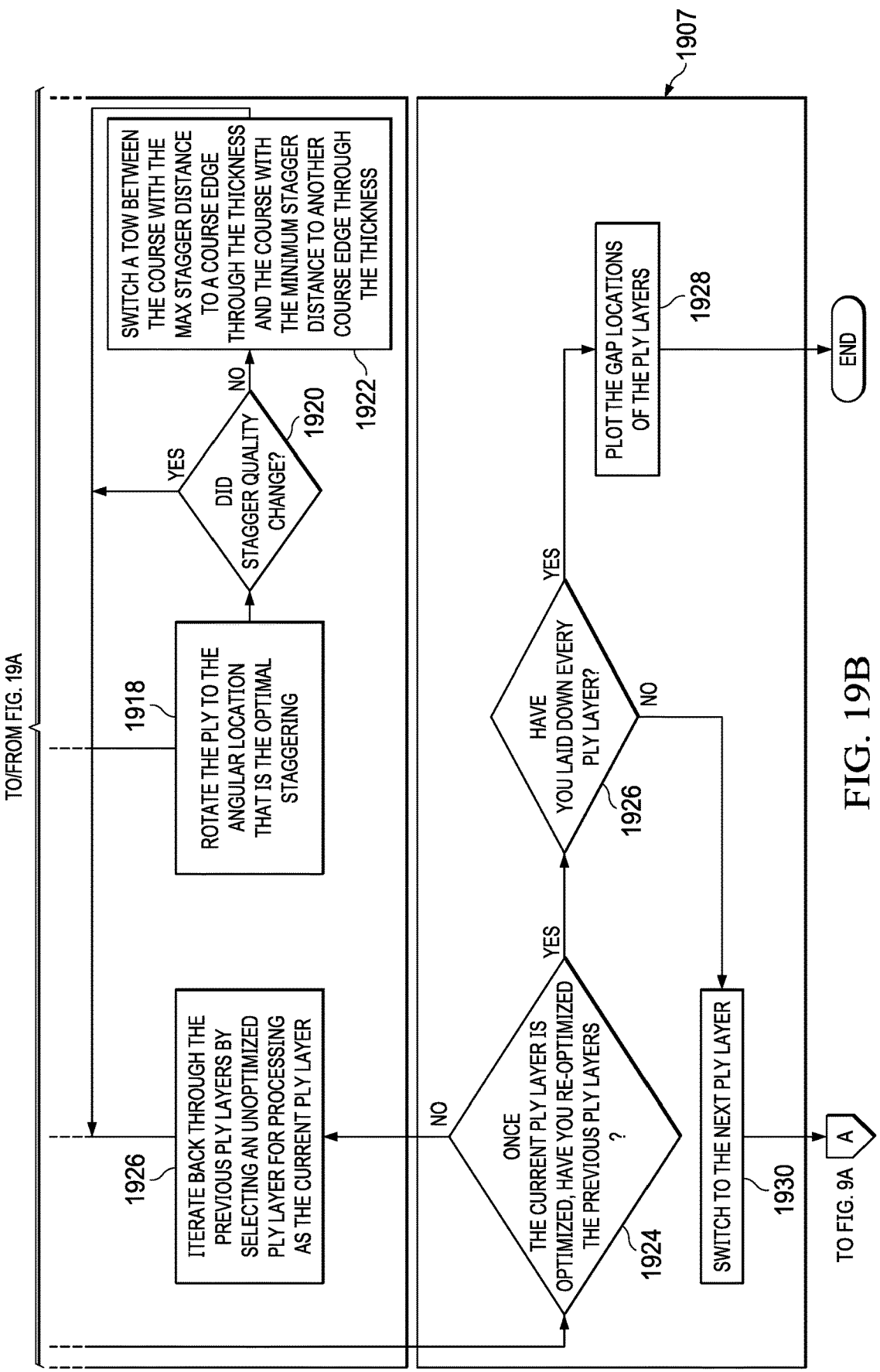

Turning next to FIGS. 19A and 19B, an illustration of a flowchart of process for creating a design for a hollow composite body is depicted in accordance with an illustrative embodiment. The process in FIGS. 19A and 19B can be implemented in hardware, software, or both. When implemented in software, the process can take the form of program code that is run by one of more processor units located in one or more hardware devices in one or more computer systems. For example, the process can be implemented in composite structure manager 212 in computer system in FIG. 2.

In creating the design, the process has a number of different sections. In section 1901, the process identifies information and calculates values for creating the design. In section 1903, the process lays down a ply for the design. The process optimizes ply lay down based on previous plies laid down in section 1905. In this phase, the goal is to optimize the average and minimum arc distance between course edges throughout the thickness of the ply layers. In section 1907, the process iterates to each ply that has been laid down and optimizes.

The process begins in section 1901 by inputting plies to lay, tool information, ply information, and machine tolerances (operation 1900). The process determines the circumference and radius for each ply (operation 1902).

The process proceeds to section 1903 and determines how many courses consisting of the optimal tow count can fit on each ply (operation 1904). This operation takes into account that circumference increases with ply numbers. In other words, the outermost ply as a larger circumference than innermost ply in the design.

In the illustrative example, the optimal tow count can be determined by the limitations of the compaction roller in the automated fiber placement (AFP) machine that lays up the tows and the ability this compaction roller to conform to the contour. For zero orientation plies on a small curvature, the number of tows can be reduced to ensure proper compaction.

Also, for larger contours that are not limited by roller compliance, the optimal number of tows can as many of tows as possible by the head in automated fiber placement (AFP) machine. This number can be reduced by one or more tows to provide flexibility to choose when to add tows to a course.

Optimal tow count can also be the number of whole tows that is required to cover the circumference without causing an overlap. This selection of the number of tows can result in a gap up to a tow width wide. The gap is evenly distributed as smaller equal gaps between individual courses in the illustrative example.

The process determines the portion of the circumference for each ply layer not filled by courses with optimal tow counts; determines how many additional tows can be added; and distributes the additional tows around the courses (operation 1906). In one illustrative example, if the last course is less than the optimal course width, the remainder of tows can be distributed between the other courses. For example, if 8 tows are optimal per course, and the last course to close-out the ply only requires 5 tows, those 5 tows can be be distributed evenly around the circumference by adding a tow to 5 different courses. The distribution of additional toes can keep the stagger pattern generally equal.

The process distributes the gap length not fillable by additional tows as gaps between courses (operation 1908). In this operation, space may still be present in the circumference of a ply layer after adding additional tows. Is the gap length. If a gap length is absent, gaps are not present between the course edges.

The process determines how effective the first attempt was in staggering course edges (operation 1910). In operation 1910, the amount of staggering between course edges between different ply layers is determined in operation 1910 and can be compared to a tolerance or standard for a desired level of staggering. In this illustrative example, the average and the minimum arc distance between course edges for courses are determined throughout the thickness of the ply layers. In this illustrative example, calculations may also be made with respect to gaps between course edges.

The process proceeds to section 1905 and determines if the iterations for the current ply layer have been exhausted (operation 1912). In other words, operation 1912 determines whether the number of iterations for the ply layer has been performed. The number of iterations performed for a ply layer can be selected in a number of different ways. For example, the number of iterations for a ply layer can be selected based on determining how many iterations may be needed optimize particular ply layer. As the number by layers increase in a design, this number also increases. For example, 100 iterations may be selected for a design having 110 ply layers.

If the number of iterations for the current play layer have not been performed, the process determines whether the current ply location has the best staggering for all of the iterations performed (operation 1914). This illustrative example, the current ply layer location is the location of the ply layer relative to other ply layers in the design. In the illustrative example, this ply layer location includes the location of courses and course edges. This ply layer location may also include the location of gaps. The location of these different features may be based on polar coordinates relative to an axis extending through the design for the hollow composite body.

If the current ply layer location is the best location of all of the iterations, the process stores the current ply location as the best one (operation 1916). The process rotates the ply layer to an angular location that has the optimal staggering (operation 1918). In operation 1918, the optimal staggering is the best staggering of course edges with respect to course edges in other ply layers. The process then determines whether the stagger quality has changed (operation 1920). In operation 1920, the measure can be the minimum distance. A larger number of minimum distance be mean a better deigns. In one example, the stagger quality can be measured using the arc length between course edges (comparing to the layers beneath). The minimum arc length to another course edge through the thickness is maximized in this example.

If stagger quality did not change, the process switches a tow between the course with the maximum staggering distance to a course edge through the thickness and the course with the minimum standard distance to another course edge through the thickness (operation 1922). The process then returns to operation 1912. In this illustrative example, the stagger distance can be an arc length, or a number of degrees separated two course edges.

With reference again to operation 1920, if it did not change, the process returns directly to operation 1912. With reference back to operation 1912, if the number of iterations set for the ply layer have been performed, the process moves to section 1907 and determines whether the previous ply layers have been re-optimized now that the current ply layer has been optimized (operation 1924). This illustrative example, the process also proceeds to operation 1924 from operation 1912 if all the iterations had been performed for the current ply layer being optimized.

If the previous ply layers have not been reoptimized, the process iterates back through the previous ply layers by selecting another ply layer for processing (operation 1926). The process then proceeds to operation 1912.

With reference again to operation 1924, if the previous ply layers have been reoptimized, the process determines whether every ply layer has been laid down (operation 1928). This operation is used to determine whether the design has been completed.

If all of the ply layers have not been laid down, the process switches to the next ply layer (operation 1928). The process then proceeds to operation 1912 described above.

With reference to operation 1926, if all of the ply layers have been laid down, the process plots the gap locations of the ply layers (operation 1928). The process terminates thereafter. Operation 1928 provides a visualization of the staggering to a human operator.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 20:
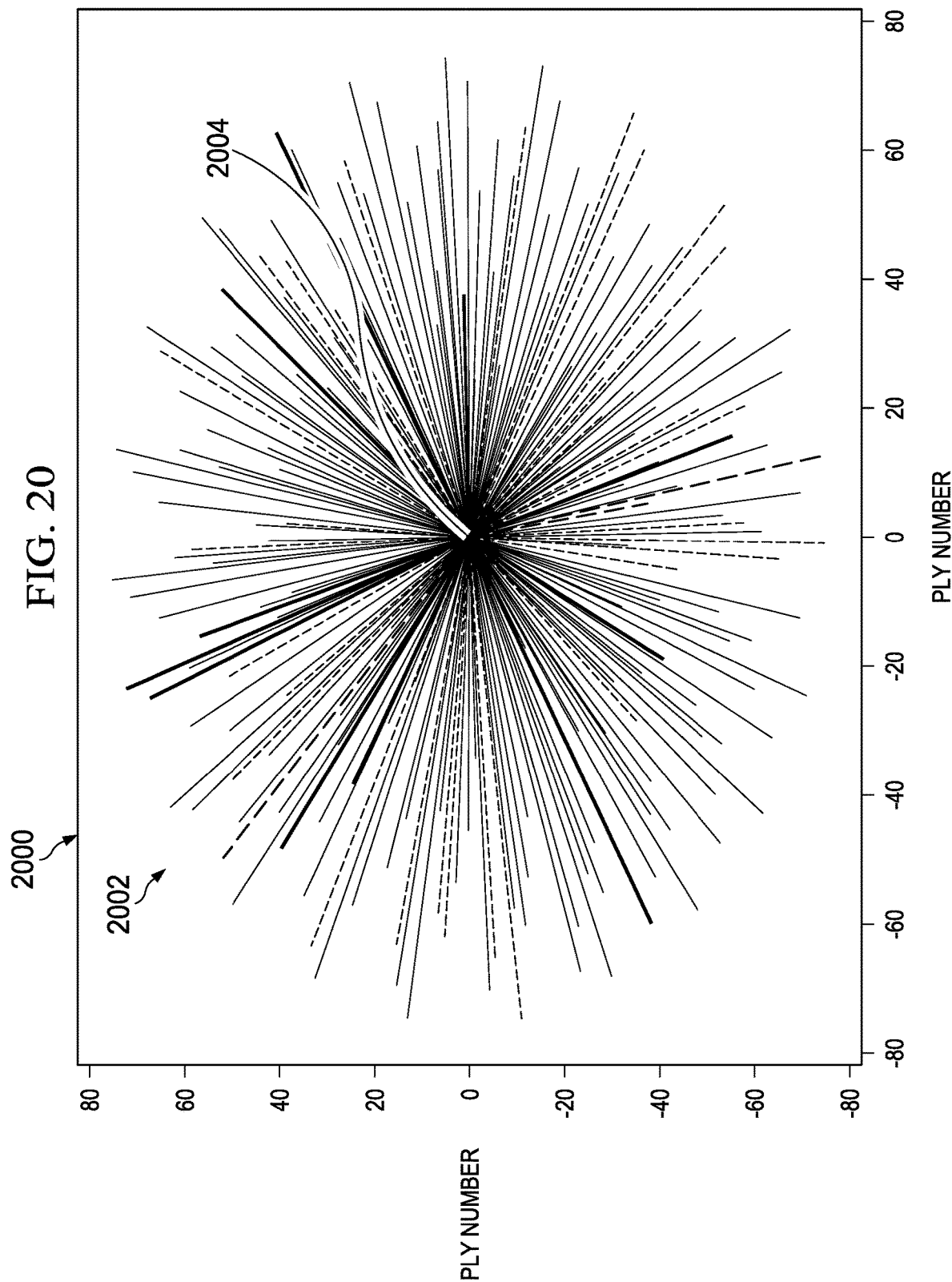
FIG. 20 is an illustration of locations for ply layers in accordance with an illustrative embodiment.

With reference next to FIG. 20, an illustration of locations for ply layers is depicted in accordance with an illustrative embodiment. In this illustrative example, graph 2000 is an example of a graphic be generated by plotting applications in operation 1928 in the flowchart FIG. 19. In this illustrative example, graph 2000 represents a plot of a design having 110 ply layers for a submersible hall. The orientation of these ply layers 0 degrees indisposed example. I Lines 2002 extend radially from axis 2004 to a centerline for gaps in the ply layers. As depicted, axis 2004 extends centrally through the submersible hull design. The length of lines 2002 identify the ply layer in which a gap is present between course edges for courses in the ply layer. Arcs or angles can be determined between lines for different ply layers to identify the staggering of course edges between ply layers in the design.

Figure 21:
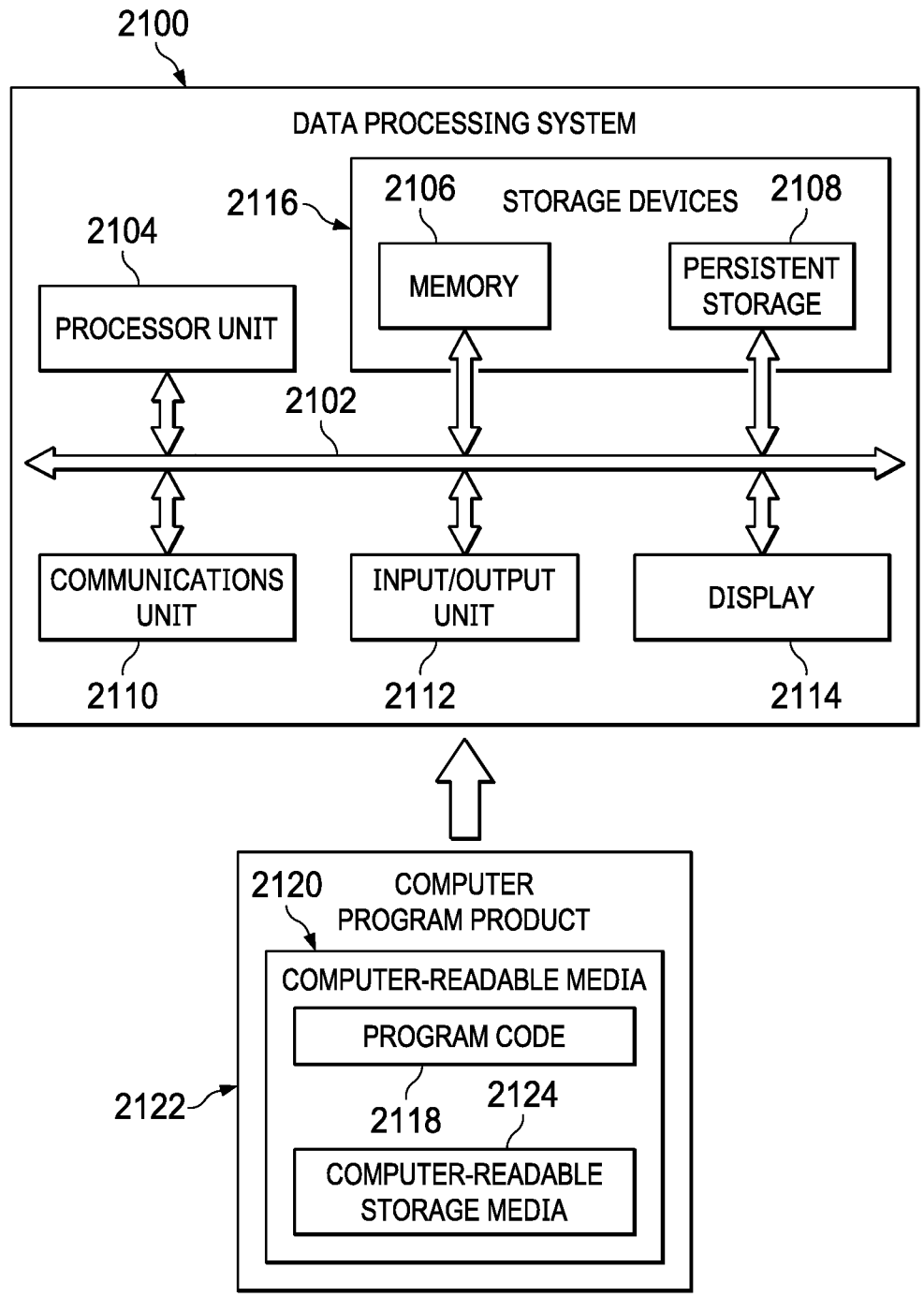
FIG. 21 is an illustration of a block diagram of a data processing system in accordance with an illustrative embodiment.

Turning now to FIG. 21, an illustration of a block diagram of a data processing system is depicted in accordance with an illustrative embodiment. Data processing system 2100 can be used to implement server computer 104, server computer 106, client systems 110, in FIG. 1. Data processing system 2100 can also be used to implement computer system 210 in FIG. 2. In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 takes the form of a bus system.

Processor unit 2104 serves to execute instructions for software that can be loaded into memory 2106. Processor unit 2104 includes one or more processors. For example, processor unit 2104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2104 can may be implemented using one or more heterogeneous processor systems in which a main processor is present with secondary processors on a single chip. As another illustrative example, processor unit 2104 can be a symmetric multi-processor system containing multiple processors of the same type on a single chip.

Memory 2106 and persistent storage 2108 are examples of storage devices 2116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2116 may also be referred to as computer-readable storage devices in these illustrative examples. Memory 2106, in these examples, can be, for example, a random-access memory or any other suitable volatile or non-volatile storage device. Persistent storage 2108 can take various forms, depending on the particular implementation.

For example, persistent storage 2108 may contain one or more components or devices. For example, persistent storage 2108 can be a hard drive, a solid-state drive (SSD), a flash memory, a rewritable optical disk, a rewritable magnetic tape, or some combination of the above. The media used by persistent storage 2108 also can be removable. For example, a removable hard drive can be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that can be connected to data processing system 2100. For example, input/output unit 2112 can provide a connection for user input through at least one of a keyboard, a mouse, or some other suitable input device. Further, input/output unit 2112 can send output to a printer. Display 2114 provides a mechanism to display information to a user.

Instructions for at least one of the operating system, applications, or programs can be located in storage devices 2116, which are in communication with processor unit 2104 through communications framework 2102. The processes of the different embodiments can be performed by processor unit 2104 using computer-implemented instructions, which can be located in a memory, such as memory 2106.

These instructions are program instructions and are also referred to as program code, computer usable program code, or computer-readable program code that can be read and executed by a processor in processor unit 2104. The program code in the different embodiments can be embodied on different physical or computer-readable storage media, such as memory 2106 or persistent storage 2108.

Program code 2118 is located in a functional form on computer-readable media 2120 that is selectively removable and can be loaded onto or transferred to data processing system 2100 for execution by processor unit 2104. Program code 2118 and computer-readable media 2120 form computer program product 2122 in these illustrative examples. In the illustrative example, computer-readable media 2120 is computer-readable storage media 2124.

Computer-readable storage media 2124 is a physical or tangible storage device used to store program code 2118 rather than a media that propagates or transmits program code 2118. Computer readable storage media 2124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 2118 can be transferred to data processing system 2100 using a computer-readable signal media. The computer-readable signal media are signals and can be, for example, a propagated data signal containing program code 2118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2120" can be singular or plural. For example, program code 2118 can be located in computer-readable media 2120 in the form of a single storage device or system. In another example, program code 2118 can be located in computer-readable media 2120 that is distributed in multiple data processing systems. In other words, some instructions in program code 2118 can be located in one data processing system while other instructions in program code 2118 can be located in one data processing system. For example, a portion of program code 2118 can be located in computer-readable media 2120 in a server computer while another portion of program code 2118 can be located in computer-readable media 2120 located in a set of client computers.

The different components illustrated for data processing system 2100 are not meant to provide architectural limitations to the manner in which different embodiments can be implemented. In some illustrative examples, one or more of the components may be incorporated in or otherwise form a portion of, another component. For example, memory 2106, or portions thereof, can be incorporated in processor unit 2104 in some illustrative examples. The different illustrative embodiments can be implemented in a data processing system including components in addition to or in place of those illustrated for data processing system 2100. Other components shown in FIG. 21 can be varied from the illustrative examples shown. The different embodiments can be implemented using any hardware device or system capable of running program code 2118.

Figure 22:
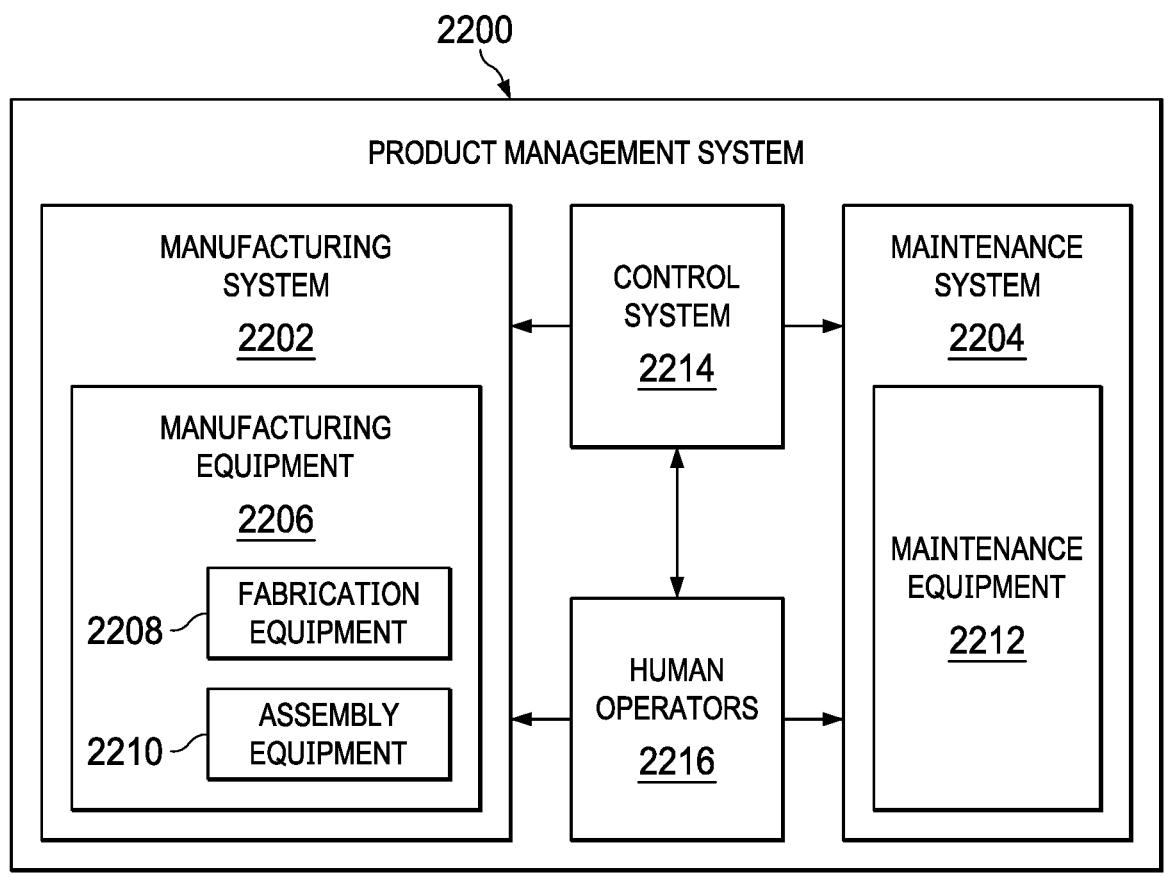
FIG. 22 is an illustration of a block diagram of a product management system in accordance with an illustrative embodiment.

Turning now to FIG. 22, an illustration of a block diagram of a product management system is depicted in accordance with an illustrative embodiment. Product management system 2200 is a physical hardware system. In this illustrative example, product management system 2200 includes at least one of manufacturing system 2202 or maintenance system 2204.

Manufacturing system 2202 is configured to manufacture products, such as submersible vehicle, and aircraft, spacecraft, or other suitable platforms. As depicted, manufacturing system 2202 includes manufacturing equipment 2206. Manufacturing equipment 2206 includes at least one of fabrication equipment 2208 or assembly equipment 2210.

Fabrication equipment 2208 is equipment that used to fabricate components for such as composite parts for a product, such as a composite hollow body. For example, fabrication equipment 2208 can include machines and tools. These machines and tools can be at least one of a drill, a hydraulic press, a furnace, an autoclave, a mold, a composite tape laying machine, an automated fiber placement (AFP) machine, a vacuum system, a robotic pick and place system, a flatbed cutting machine, a laser cutter, a computer numerical control (CNC) cutting machine, a lathe, or other suitable types of equipment. Fabrication equipment 2208 can be used to fabricate at least one of metal parts, composite parts, semiconductors, circuits, fasteners, ribs, skin panels, spars, antennas, or other suitable types of parts.

Assembly equipment 2210 is equipment used to assemble parts to form a platform. In particular, assembly equipment 2210 is used to assemble components and parts to form a platform. Assembly equipment 2210 also can include machines and tools. These machines and tools may be at least one of a robotic arm, a crawler, a faster installation system, a rail-based drilling system, or a robot.

In this illustrative example, maintenance system 2204 includes maintenance equipment 2212. Maintenance equipment 2212 can include any equipment needed to perform maintenance a platform. Maintenance equipment 2212 may include tools for performing different operations on parts the product. These operations can include at least one of disassembling parts, refurbishing parts, inspecting parts, reworking parts, manufacturing replacement parts, or other operations for performing maintenance on a platform. These operations can be for routine maintenance, inspections, upgrades, refurbishment, or other types of maintenance operations.

In the illustrative example, maintenance equipment 2212 may include ultrasonic inspection devices, x-ray imaging systems, vision systems, drills, crawlers, and other suitable devices. In some cases, maintenance equipment 2212 can include fabrication equipment 2208, assembly equipment 2210, or both to produce and assemble parts that needed for maintenance.

Product management system 2200 also includes control system 2214. Control system 2214 is a hardware system and may also include software or other types of components. Control system 2214 is configured to control the operation of at least one of manufacturing system 2202 or maintenance system 2204. In particular, control system 2214 can control the operation of at least one of fabrication equipment 2208, assembly equipment 2210, or maintenance equipment 2212.

The hardware in control system 2214 can be implemented using hardware that may include computers, circuits, networks, and other types of equipment. The control may take the form of direct control of manufacturing equipment 2206. For example, robots, computer-controlled machines, and other equipment can be controlled by control system 2214. In other illustrative examples, control system 2214 can manage operations performed by human operators 2216 in manufacturing or performing maintenance on aircraft A200. For example, control system 2214 can assign tasks, provide instructions, display models, or perform other operations to manage operations performed by human operators 2216. In these illustrative examples, composite structure manager 212 in FIG. 2 can be implemented in control system 2214 to manage at least one of the manufacturing or maintenance of a product.

In the different illustrative examples, human operators 2216 can operate or interact with at least one of manufacturing equipment 2206, maintenance equipment 2212, or control system 2214. This interaction can occur to manufacture a product such as a submersible vehicle or an aircraft.

Of course, product management system 2200 may be configured to manage other products other than a submersible vehicle or an aircraft. For example, other products can include, for example, a spacecraft, a rocket, a land vehicle, or some other suitable platform that implements a hollow composite button. Although product management system 2200 has been described with respect to manufacturing in the aerospace industry, product management system 2200 can be configured to manage products for other industries. For example, product management system 2200 can be configured to manufacture products for the automotive industry as well as any other suitable industries.

Thus, the illustrative embodiments provide a method, apparatus, system, and computer program product for designing a composite hollow body. A computer system selects ply layers for the hollow composite body. The ply layers comprise courses having course edges. The computer system positions the course edges between the ply layers throughout the hollow composite body to create a staggering of the course edges between the ply layers for a design of the hollow composite body, wherein a level of the staggering of the course edges between the ply layers reduces undesired inconsistencies in fabricating the hollow composite body.

As a result, one or more illustrative examples enable reducing undesired inconsistencies in a composite hollow body fabricated using a design having reduced staggering through at least one of rotating or changing the width of courses in ply layers these changes can increase the amount of staggering course edges between ply layers throughout the design of the composite hollow body. In one or more illustrative examples, techniques with different levels of granularity for adjusting course edges can be used. For example, rotating apply layer provides one level of adjusting the position of course edges while changing course widths provides a higher level of granularity in adjusting the position of course edges. These techniques can be used in an iterative fashion that can reduce the overlap of course edges to level that reduces undesired inconsistencies.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for fabricating a hollow composite body comprising ply layers and a central axis, the method comprising:
    executing, using a computer system, the following steps:
        determining a number of tows in each course and a number of courses in a ply layer to be laid up around the central axis, wherein the number of tows reduces a sum of arc distances between edges of each course in the ply layer to a value less than a thickness of a tow in the number of tows; and
        determining, iteratively for each ply layer from a furthest ply layer from the central axis to a ply layer closest to the central axis, a radial position around the central axis of an arc between edges of courses adjacent in the ply layer, wherein the radial position forms a radial alignment of the arc with a least number possible of gaps between edges of courses, respectively, in all of the ply layers previously laid up around the central axis; and
    fabricating, by controlling fabricating equipment, the hollow composite body with steps of:
        laying up a number of tows in each course and the number of courses in the ply layer around the central axis as determined by the computer system, wherein the number of tows reduces the sum of arc distances between edges of each course in the ply layer to the value less than the thickness of the tow in the number of tows; and laying up each ply layer as determined by the computer system from a furthest ply layer from the central axis to the ply layer closest to the central axis, at the radial position around the central axis of the arc between edges of courses adjacent in the ply layer as determined by the computer system, wherein the radial position forms the radial alignment of the arc with the least number possible of gaps between edges of courses, respectively, in all of the ply layers previously laid up around the central axis.

2. The method of claim 1, further comprising:
the fabrication equipment comprising an automated fiber placement machine; and
reducing the least number of possible gaps between edges of courses, respectively, in all of the ply layers previously laid up around the central axis by rotating, by the computer system, a selected ply layer in the ply layers previously laid up around the central axis.

3. The method of claim 1, further comprising changing, by the computer system, a width of selected courses in a selected ply layer such that the edges of each course form an increased staggering between all the ply layers.

4. The method of claim 3, further comprising:
adding, by the computer system, a number of tows to a first course in the selected ply layer; and
removing, by the computer system, the number of tows from a second course in the selected ply layer, wherein the edges of each course in the selected ply layer form the increased staggering of the edges of each course between the ply layers.

5. The method of claim 4, further comprising:
selecting, by the computer system, the first course having a first course edge in the selected ply layer that has a minimum staggering from another course edge in the course edges in other ply layers; and
adding, by the computer system, the number of tows to the first course that is selected.

6. The method of claim 4, further comprising:
selecting, by the computer system, the second course having a second course edge in the selected ply layer that has a maximum staggering from another course edge in the course edges in other ply layers; and
removing, by the computer system, the number of tows from the second course that is selected.

7. The method of claim 1, further comprising:
rotating, by the computer system, a selected ply layer in the ply layers to increase staggering of the edges of courses between the ply layers; and
alternating, by the computer system, a number of tows between courses in the selected ply layer to increase the staggering of the edges of courses of edges of each course in other ply layers in response to rotating the selected ply layer not resulting in a desired level of staggering of the edges of each course between the ply layers.

8. The method of claim 7, further comprising repeating the rotating and alternating steps, by the computer system, for a next ply layer in the ply layers in response to the desired level of staggering being absent.

9. The method of claim 1, further comprising:
selecting, by the computer system, a next ply layer in the ply layers for processing;
rotating, by the computer system, the next ply layer to increase staggering of all course edges between all ply layers; and
alternating, by the computer system, a number of tows between courses in the next ply layer to increase the staggering of the course edges between the ply layers in response to rotating the next ply layer not resulting in a desired level of staggering of the edges of each course between the ply layers; and
repeating the selecting the next ply layer, rotating the next ply layer, and alternating the number of tows between the courses in the next ply layer, by the computer system, until all of the ply layers have been processed.

10. The method of claim 1, further comprising precluding undesired inconsistencies occurring in the hollow composite body occurring of the ply layers via:
laying up composite materials in the courses and forming the ply layers for the hollow composite body as determined by the computer system; and
curing the ply layers laid up and creating the hollow composite body.

11. The method of claim 10, further comprising laying up tows in the courses to create the ply layers for the hollow composite body.

12. The method of claim 1, wherein an overlap between the edges of each course in the courses throughout the ply layers is absent.

13. The method of claim 1, wherein an overlap between the edges of each course for the courses throughout the ply layers occurs every n layers.

14. The method of claim 1, wherein the ply layers have a same orientation selected from a group comprising 0 degrees and 45 degrees.

15. The method of claim 1, wherein the edges of courses between the courses in a ply layer form at least one of a gap, an overlap, or an abutted edge.

16. The method of claim 1, wherein the hollow composite body is selected from a group that consists of: a submersible hull, a submarine hull, a wing, rocket, and an fuselage.

17. A method for fabricating a hollow composite body comprising a central axis, the method comprising:
using a computer system controlling the following steps:
selecting a ply layer in ply layers in a design for the hollow composite body to form a selected ply layer;
determining a desired level of staggering of gaps between edges of courses in the ply layers in the design and producing a level, below a desired threshold, of inconsistencies in the hollow composite body; and
staggering on fabrication equipment, in an iterative manner from the selected ply layer followed by each ply layer closer to the central axis in the ply layers, course edges between the selected ply layer in the ply layers and the each ply layer closer to the central axis in the ply layers and thereby forming a least number possible of gaps between edges of courses aligned along a radial off the central axis, respectively, in all of the ply layers previously laid up around the central axis; and
fabricating, by controlling fabricating equipment, the hollow composite body by:
laying up the ply layers by staggering gaps between edges of courses in the ply layers as determined in the design and producing the level, below a desired threshold, of inconsistencies in the hollow composite body; and
laying up, on fabrication equipment, the ply layers by staggering in the iterative manner from the selected ply layer followed by each ply layer closer to the central axis in the ply layers, course edges between the selected ply layer in the ply layers and the each ply layer closer to the central axis in the ply layers and thereby forming the least number possible of gaps between edges of courses aligned along the radial off the central axis, respectively, in all of the ply layers previously laid up around the central axis.

18. The method of claim 17, further comprising the computer system:
   determining, using simulations, the desired level of staggering;
   rotating the selected ply layer; and
   repeating rotating for each ply layer in other ply layers until the desired level of staggering occurs.

19. The method of claim 17, further comprising the computer system:
   determining, using empirical data, the desired level of staggering;
   changing a width of the courses in the selected ply layer such that an arc between edges of courses adjacent in the ply layer forms a radial alignment with a least number possible of gaps between edges of courses, respectively, in all of ply layers previously laid up around the central axis; and
   repeating changing the width of the courses each other ply layer in the other ply layers based on staggering resulting from changing the width.

20. The method of claim 17, further comprising:
   rotating, by the computer system, the selected ply layer such that increased staggering between the selected ply layer and the course edges in the other ply layers occurs;
   changing, by the computer system, a width of the courses in the selected ply layer such that an arc between edges of courses adjacent in the ply layer forms a radial alignment with a least number possible of gaps between edges of courses, respectively, in all of the ply layers previously laid up around the central axis; and
   repeating rotating and changing for each other ply layer in the other ply layers, by the computer system.

21. The method of claim 17, wherein:
   the fabrication equipment comprises an automated fiber placement machine; and
   the selected ply layer is a newly added ply layer.

22. The method of claim 17, wherein the selected ply layer is an existing ply layer within the ply layers.

* * * * *